United States Patent
Mathiesen et al.

(10) Patent No.: US 10,445,593 B1
(45) Date of Patent: Oct. 15, 2019

(54) USER INTERFACE FOR ACQUISITION OF GROUP DATA

(71) Applicant: AMAZON TECHNOLOGIES, INC., Seattle, WA (US)

(72) Inventors: Thomas Meilandt Mathiesen, Seattle, WA (US); Maren Marie Costa, Seattle, WA (US); Nishitkumar Ashokkumar Desai, Redmond, WA (US); Christopher Richard Fescoe, Seattle, WA (US); Casey Louis Thurston, Suquamish, WA (US); Jason Michael Famularo, Seattle, WA (US); Sudarshan Narasimha Raghavan, Seattle, WA (US); Waqas Ahmed, Clyde Hill, WA (US); Danny Guan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 77 days.

(21) Appl. No.: 15/193,552

(22) Filed: Jun. 27, 2016

(51) Int. Cl.
| | |
|---|---|
| *G06K 9/00* | (2006.01) |
| *G06T 7/20* | (2017.01) |
| *G06F 3/0481* | (2013.01) |
| *H04N 7/18* | (2006.01) |
| *G06F 3/0484* | (2013.01) |

(52) U.S. Cl.
CPC ..... *G06K 9/00778* (2013.01); *G06F 3/04817* (2013.01); *G06F 3/04847* (2013.01); *G06K 9/00369* (2013.01); *G06T 7/2093* (2013.01); *H04N 7/181* (2013.01); *G06T 2200/24* (2013.01); *G06T 2207/10016* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| 6,867,683 B2 * | 3/2005 | Calvesio ............ G07C 9/00087 340/5.52 |
| 7,225,980 B2 | 6/2007 | Ku et al. |
| 7,949,568 B2 | 5/2011 | Fano et al. |
| 8,009,864 B2 | 8/2011 | Linaker et al. |
| 8,189,855 B2 | 5/2012 | Opalach et al. |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Delomia L Gilliard
(74) *Attorney, Agent, or Firm* — Lindauer Law, PLLC

(57) ABSTRACT

Users may enter a facility singly or in groups. A user interface may be presented to an associate that includes information obtained from sensors in the facility. The associate may utilize the information presented to determine if a user is alone, or to associate that user with a particular group of users. Input from the associate obtained from this user interface may then be used by a facility management system during operation to attribute the actions of the users to a particular account.

21 Claims, 20 Drawing Sheets

(56) References Cited

U.S. PATENT DOCUMENTS

| | | | |
|---|---|---|---|
| 8,630,924 B2 | 1/2014 | Groenevelt et al. | |
| 8,831,299 B2 | 9/2014 | Kurtz et al. | |
| 9,235,928 B2 | 1/2016 | Medioni et al. | |
| 9,336,435 B1* | 5/2016 | Ozog | G06K 9/00288 |
| 9,641,520 B2 | 5/2017 | Neuman et al. | |
| 9,798,742 B2* | 10/2017 | Cardonha | G06F 17/30247 |
| 2005/0055582 A1* | 3/2005 | Bazakos | G06K 9/00228 726/19 |
| 2005/0093697 A1 | 5/2005 | Nichani et al. | |
| 2008/0037838 A1 | 2/2008 | Ianculescu et al. | |
| 2008/0132251 A1* | 6/2008 | Altman | G06Q 30/0207 455/457 |
| 2010/0138037 A1* | 6/2010 | Adelberg | G06Q 10/087 700/241 |
| 2011/0011936 A1 | 1/2011 | Morandi et al. | |
| 2012/0216257 A1* | 8/2012 | Steiner | G06Q 50/01 726/4 |
| 2012/0284132 A1 | 11/2012 | Kim et al. | |
| 2013/0191791 A1 | 7/2013 | Rydenhag et al. | |
| 2013/0257590 A1* | 10/2013 | Kuenzi | G05B 1/01 340/5.65 |
| 2013/0284806 A1 | 10/2013 | Margalit | |
| 2014/0018172 A1* | 1/2014 | Collard | G06F 3/011 463/36 |
| 2015/0086107 A1 | 3/2015 | Dedeoglu et al. | |
| 2016/0048721 A1* | 2/2016 | Harper | G06K 9/00771 382/103 |
| 2016/0180156 A1* | 6/2016 | Marcheselli | G06K 9/00335 382/103 |
| 2016/0210621 A1* | 7/2016 | Khan | G06Q 20/3821 |
| 2016/0352712 A1* | 12/2016 | Tamp | H04L 63/08 |
| 2017/0303081 A1* | 10/2017 | Davis | H04W 4/02 |
| 2018/0032799 A1* | 2/2018 | Marcheselli | G07C 9/00 |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL: http://www.researchgate.net/publication/221568350_How_to_nudge_in_Situ_designing_lambent_devices_to_deliver_salient_information_in_supermarkets>.

Pop,Cristian, "Introduction to the BodyCom Technology", AN1391, DS01391A, Microchip Technology, Inc., May 2, 2011.

Brown, Vernal U., "Non-Final Office Action dated May 31, 2017", U.S. Appl. No. 15/193,858, The United States Patent and Trademark Office, May 31, 2017.

* cited by examiner

US 10,445,593 B1

USER INTERFACE FOR ACQUISITION OF GROUP DATA

BACKGROUND

Facilities such as stores, libraries, hospitals, offices, and so forth, may maintain areas in which inventory is stored. Users may enter these areas to replenish items, obtain items, and so forth. It may be desirable to monitor the movement of users within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
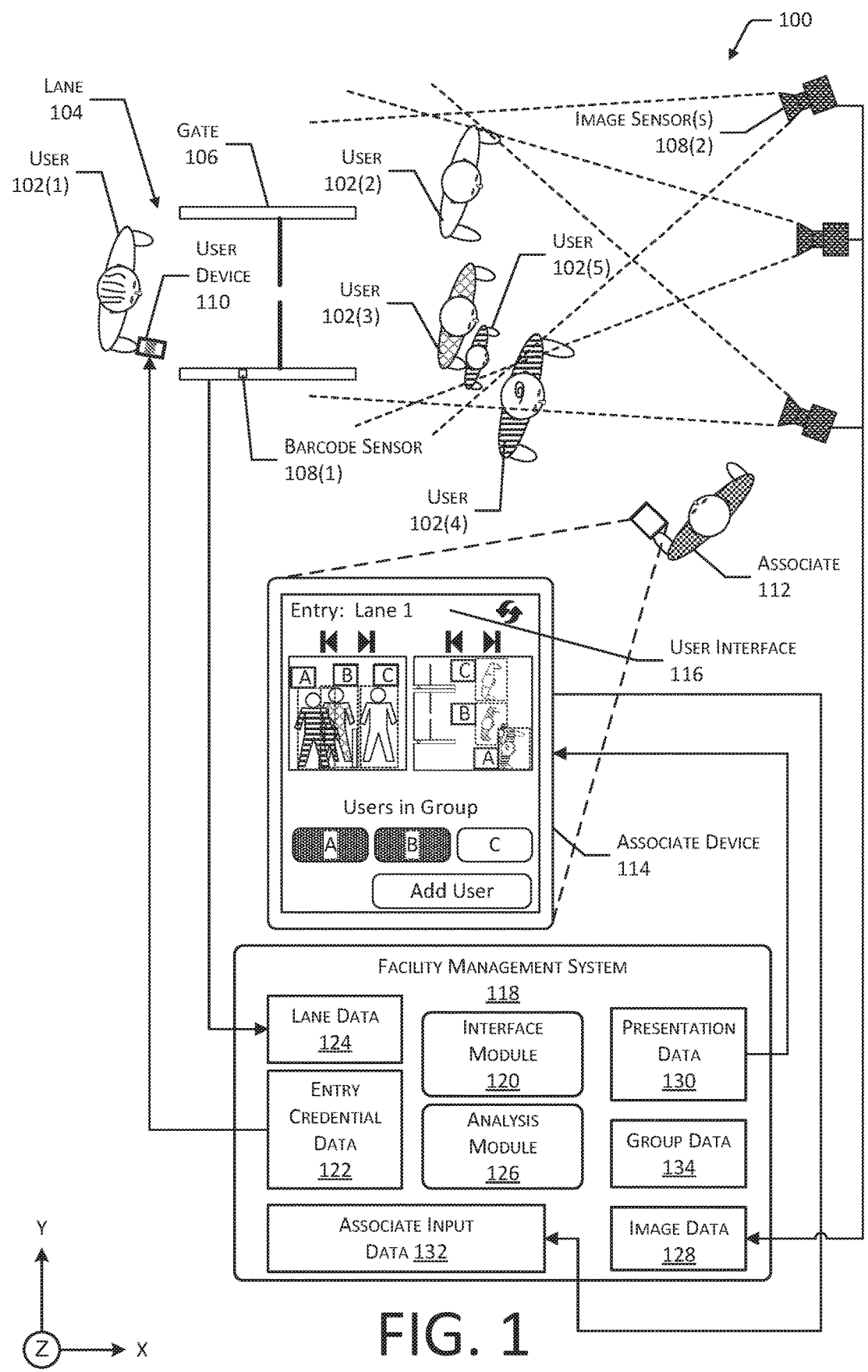
FIG. 1 illustrates a system to determine information about user entry to a facility and provide interfaces to gather data about that entry, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to".

DETAILED DESCRIPTION

Described in this disclosure are systems and techniques for determining information about users entering, using, and exiting a facility. The facility may include a materials handling facility that stores items for rent, lease, purchase, checkout, and so forth. The facility may include, or have access to, a facility management system. The facility management system may be configured to maintain information about items, users, condition of the facility, and so forth. For example, the facility management system may maintain data indicative of a number of items at a particular inventory location, a location of the user within the facility, who the user is, what group of users a particular user is a member of, how many items have been picked or placed at the inventory location by the user, requests for assistance, environmental status of the facility, and so forth.

Operation of the facility may be facilitated by using one or more sensors to acquire information about occurrences in the facility. The facility management system may process the sensor data from the one or more sensors to determine information such as tracking data, identification data, interaction data, and so forth. The tracking data comprises information indicative of a particular location of a user within the facility at particular times. The identification data provides information that associates the user with a particular identifier, such as a billing account number, user login, and so forth. The interaction data is indicative of action such as picking or placing an item at a particular inventory location, presence of the user at the inventory location, and so forth. For example, the facility management system may use the sensor data to generate interaction data that indicates a type of item a user picked from a particular inventory location, quantity of the pick, and so forth.

An inventory location may include shelves, hooks, and so forth, that hold or otherwise support a type of item. Items may be added to (placed) or removed (picked) from the inventory location. Each inventory location may hold a different type of item and may include one or more sensors. The sensors may include weight sensors, capacitive sensors, image sensors, and so forth. Users may move from one inventory location to another within the facility to examine items, pick items, place items, and so forth. The facility management system may use the data from these sensors to determine the interaction data.

As users enter and exit the facility, they pass through a designated area that is designed to facilitate identification and tracking of the user. For example, an entry area may include one or more gates through which users may pass to enter the facility. Likewise, users may exit the facility by passing through a gate. In some implementations, the entry area may include gates designated for ingress and gates designated for egress. In other implementations, a separate exit area may be designated.

A user of the facility may approach the entry area with a user device. For example, the user device may comprise a smartphone, tablet computer, wearable computing device, and so forth. The user device presents entry credential data that is acquired by the sensor at the gate. For example, the user's smartphone may present an image of a two-dimensional barcode that is read by a camera at the gate. The entry credential data may be used to associate the user with a particular identifier, such as a billing account number, user login, and so forth.

One or more sensors such as image sensors or cameras may be used to track the user as they move within the entry area and also within at least a portion of the facility. Computer vision tracking algorithms may be used to track the user as they travel through various aisles of the facility. Tracking may be discontinued or omitted from particular areas, such as conference rooms or restrooms.

Sometimes a group of users may enter the facility. For example, a party of three users may enter. Actions attributed to a member of the group may be aggregated. For example, a pick or place by a user of the group may result in a charge accruing to the billing account associated with the group. Computers may implement algorithms to determine whether a user entering the facility is alone or a member of a group, and if a member of a group who the other members of the group are as well.

In some situations, automated systems may experience one or more of a loss of tracking, loss of identification, or low confidence in group membership of the users. Upon determination by an automated system that the output of a situation has been deemed to be unreliable, such as when having a confidence value that is below a threshold value, the judgment of a human operator such as an associate may be utilized. In one implementation, the associate may be on-site at the facility, such as stationed at the entry area. In another implementation, the associate may be off-site, such as at a centralized processing facility or working from home. In yet another implementation, a combination of associates that are on-site and off-site may be utilized.

The facility management system may access the sensor data to generate image gallery data. The image gallery data may comprise information associated with a particular user of the facility. The image gallery data may be based on sensor data obtained at a particular time, location, and so forth. For example, the image gallery data may comprise images of the user at about the same time as when they present the user device to the scanner at the gate. The image gallery data may include one or more different views of the user that have been obtained from cameras positioned at different points within the entry area. For example, the image gallery data may include an overhead view, an oblique view, and so forth. Because of the presentation of the entry credential data, the user may be identified at least as being associated with a particular identifier such as a particular billing account.

Image gallery data may also be generated at other locations within the facility and at other times. For example, image gallery data may include images obtained of the user while within the facility. In some implementations, the image gallery data may include images acquired both at the entry area and within the facility. The image gallery data may also include other image data, such as an image of the user obtained during a registration process. For example, while setting up an account for the user to access the facility, one or more images of the user may be obtained and stored. The image gallery data may comprise still images, video clips, live video stream, and so forth. In some implementations, other data may be incorporate in or presented with the image gallery data. For example, non-image data such as a count of users passing through the gate at a particular time as generated by sensors at the gate may be presented with the image gallery data.

Upon a determination that output is unreliable, sensor data obtained within the facility may be accessed. For example, the identification of a particular user as determined by an automated system may drop below a threshold confidence value at a first time. First image data leading up to the first time and image gallery data associated with currently unidentified users in the facility may be accessed and sent to an associate device. The associate device may present a user interface that displays the first image data and the image gallery data. An associate may use one or more interface elements to select the image presented in the image gallery data that corresponds to the user depicted in the first image data that is unidentified. Associate input data indicative of the selection may be generated and provided to the facility management system. Based on this information, the facility management system may assign the identification indicated by the associate to the now identified user.

The physical arrangement of the entry area, such as the placement of the gates may be designed to facilitate a clear distinction between groups of users who may enter the facility. For example, walls, barriers, and so forth, may be used to provide an area for or after passage through the gate at which a group of users may congregate before entering the facility together.

In some situations, an automated system may be unable to determine if two or more users are member of a common group or not. For example, during peak usage hours the distance between users may decrease due to crowding. In situations where the determination of a group by the automated system has been deemed unreliable the associate may be utilized. For example, after determining that the determination of the group has dropped below a threshold confidence value, the user interface on an associate device may present image data acquired at the entry area. The associate may observe the image data to make a determination as to who is a member of a particular group. In implementations where the associate is physically present at the entry area, the associate may approach the users and seek clarifying information to make a determination as to group membership. For example, as the associate approaches a first user to engage in conversation, the failure of a second user to remain with the first user may provide information indicative of the second user not belonging to the same group as the first user. The associate may use the associate device provide associate input data that is then processed by the facility management system to generate group data.

The interaction between the automated system and human associates may be asynchronous. The automated system may experience a low confidence event at a first time that is indicative of output from the automated system being deemed unreliable. As a result of the low confidence event, subsequent events may also be low confidence events. Upon receiving the associate input data at a second time, corrections to determinations may be subsequently made and retroactively applied. For example, at the first time, the user may be tracked but not properly identified. While unidentified, the user may pick and place various items. As a result of the lack of identification associated with that user, the confidence value in the determination of who picked and placed those items may be zero. Once identification data has been obtained, such as through the associate input data provided by an associate, the identification may be retroactively applied to the now identified user. As a result, a billing account associated with the now identified user may be debited or accredited according to the value of the items picked or placed. By supporting asynchronous operation, the overall accuracy of the output provided by the facility management system is highly accurate while minimizing negative user experience that could result from delays associated in processing the sensor data by an automated system or by utilizing the associate.

By using the techniques described herein, operation of the facility may be improved. By using automated systems in conjunction with human associates, users may be able to quickly and with little or no interference enter and exit the facility. Once in the facility, the user may be accurately tracked, identified, and associated with a group (if any). User interactions may be associated with a particular identifier, such as a billing account. Details about interactions between users and items in the facility may be quickly and accurately determined. For example, as items are picked, placed, and so forth, information such as inventory levels based on changes in the count of items at the inventory locations may be readily and more accurately determined. As a result, the facility management system is able to quickly track what item a user has interacted with, maintain up-to-date inventory information, and so forth.

Illustrative System

FIG. 1 illustrates a system 100 to determine information about user entry to a facility and provide interfaces to gather data about that entry, according to some implementations.

A user 102 may be admitted to a facility by passing through a lane 104 in an entry area. The lane 104 may be defined by a gate 106. In some implementations, the gate 106 may include a movable barrier to control movement of the user 102. For example, the gate 106 may include computer-controlled panels that may be closed to impede passage of the user 102 or opened to permit passage of the user 102.

The facility may include one or more sensors 108. For example, the gate 106 may include a barcode sensor 108(1) that is built into a pedestal. The barcode sensor 108(1) may comprise an image sensor such as a camera, photodetector, or other sensing apparatus designed to read a one or two-dimensional barcode. For example, the barcode sensor may comprise a spinning mirror or microelectromechanical mirror array, configured to sweep with a photodetector to determine changes in intensity of the barcode presented on the display of the user device. As the user 102 approaches the lane 104 they access their user device 110. The user device 110 or portion thereof, such as the display, is presented to the barcode sensor 108(1). As discussed below, after presentation of the user device 110, the gate 106 may open and allow the user 102(1) entry into the facility. The interior may include one or more image sensors 108(2). For example, image sensors 108(2) such as cameras may be configured to obtain multiple views of the lane 104 and the user 102(1) who is in the lane 104, and other users 102 in the entry area.

An associate 112 may be positioned in the entry area. The associate 112 may comprise an employee, contractor, or other worker who is tasked with assisting users 102 and aiding their entry into the facility. The associate 112 may have an associate device 114. The associate device 114 may comprise a computing device that is stationary, portable, wearable, and so forth. For example, the associate device 114 depicted here may comprise a tablet computer. In another example, the associate device 114 may comprise a wearable computing device, such as a head-mounted computing device or a device that uses a head-mounted display. The associate device 114 may present a user interface 116. The user interface 116 may be used to present information obtained from or based at least in part on one or more sensors 108 of the facility. The user interface 116 may also be used to acquire information such as described below. In some implementations, the associate 112 and the associate device 114 may be physically located elsewhere. For example, the associate 112 and the associate device 114 may be working in another facility.

The facility may include a facility management system 118. The facility management system 118 may access sensor data, user input, and so forth. The facility management system 118 may be configured to perform various functions such maintaining information about entry and exit of users 102 to the facility, tracking users 102 within the facility, determining whether a particular user 102 is associated with a group, tracking changes to a quantity on hand of the items resulting from picking or placing by the user 102, and so forth.

The facility management system 118 may include or have access to an interface module 120. The interface module 120 may be configured to interact with other devices such as the user device 110, the gate 106, the associate device 114, and so forth.

In one implementation, the facility management system 118 may provide entry credential data 122 to the user device 110. The entry credential data 122 comprises information that may be expressed an image of a barcode, data encoded within a barcode, token data, and so forth. In some implementations, such as described below, the entry credential data 122 may be provided to the user device 110 responsive to a request. The entry credential data 122 may be valid for use only within a predetermined period of time, for a single use, at a particular location, and so forth. For example, the entry credential data 122 as provided by the facility management system 118 may only be valid to permit a user 102 entry into the facility for five minutes after issuance, or for a particular date and time window. The facility management system 118 may maintain or access information that associates a particular entry credential data 122 with a particular identifier, such as a billing account number, user name, and so forth.

During operation, the user device 110 obtains or generates the entry credential data 122 and presents the entry credential data 122 to the sensor 108 at the gate 106. For example, the entry credential data 122 may be presented as a two-dimensional barcode on a display of the user device 110. The display of the user device 110 depicting this two-dimensional barcode may be presented to the barcode sensor 108(1) which reads the barcode and generates lane data 124. The lane data 124 may comprise information that was received by the barcode sensor 108(1) and may also include information obtained from other sensors 108 associated with the gate 106. For example, the gate 106 may comprise a plurality of infrared light emitters and infrared light detectors to detect passage of an object, such as legs of the user 102. In some implementations, the lane data 124 may include or be based at least in part on information from these other sensors 108 at the gate 106.

The facility management system 118 may include an analysis module 126. The analysis module 126 may perform one or more functions such as determining the presence of a user 102 within a picture, tracking the user 102 as they move through the facility, identifying the user 102, determining if the user 102 is a member of a group of other users 102, and so forth. The analysis module 126 may utilize machine learning algorithms, computer vision algorithms, and so forth. The analysis module 126 may process image data 128 obtained from one or more of the image sensors 108(2) in the facility. The image data 128 may include two-dimensional images, depth maps that include distance or three-dimensional information, and so forth. For example, the image data 128 may comprise a red-green-blue image with depth or distance data associated with portions of the image, such as individual pixels or groups of pixels in the image. For example, the computer vision algorithms may be used to determine presence of a user 102 by detecting a human face within image data 128. The analysis module 126 may perform other functions, such as employing blob tracking to track an object such as a person as they move around within the image, and so forth. For example, block tracking may track a human identified as a user 102, associate 112, or someone who is unidentified. The analysis module 126 may perform tracking on an object such as a user 102, before the identity of the user 102 has been determined, or if the identity of the user 102 has been deemed unreliable. For example, if a user 102 tailgates another user 102 or jumps the gate 106, the analysis module 126 may still provide tracking for that user 102 who is unidentified. Tailgating occurs when two or more users 102 pass through the gate 106, or a designated portion of the facility, at about the same time. Tailgating typically involves a second user 102(2) walking closely next to the first user 102(1) as the first user 102(1) passes through the gate 106. The analysis module 126 may also process sensor data obtained from other sensors 108, such as the lane data 124 obtained from the barcode sensor 108(1) at the gate 106.

In some situations, the automated processes of the analysis module 126 may determine output is unreliable, such as when the output has a confidence value below a threshold value. For example, when the entry area is crowded and there are many users 102 intermixed with one another, the analysis module 126 may have a low confidence value in a determined identity of a particular user 102 or associate 112 depicted in an image obtained by the image sensors 108(2). Upon the occurrence of this low confidence event, the facility management system 118 may obtain assistance from a person such as an associate 112.

Assistance of the associate 112 may be employed in various ways. In one implementation, the facility management system 118 may generate presentation data 130 that is provided to the associate device 114. The associate device 114 may use the presentation data 130 to cause display of the user interface 116. In one implementation, the presentation data 130 may comprise a Hypertext Markup Language (HTML) document with one or more associated or embedded images. The associate device 114 may execute a rendering engine that processes the presentation data 130 and causes display on the associate device 114.

Continuing the example above in which the confidence value for identification of the user 102 has dropped below a threshold value, image data 128 may be accessed and used to generate presentation data 130. For example, the presentation data 130 may include images of the user 102 as they present their user device 110 at the gate 106. Continuing the example, the presentation data 130 may also include images of the unidentified or poorly identified user 102 within the facility. The associate 112 may view this information and either confirm or change the designation of identity. The associate device 114 generates associate input data 132 responsive to the input by the associate 112. The associate input data 132 is provided to the facility management system 118. With this data, the analysis module 126 may update the status of the user 102, assign the identity designated by the associate 112 with the previously unidentified user 102, and so forth.

In another implementation, the facility management system 118 may have a low confidence value in whether two or more users 102 form a group. As depicted in this illustration, the user interface 116 may be provided with presentation data 130 that includes various images obtained by the image sensors 108(2). The user interface 116 may accept input from the associate 112 that specifies which users 102 are deemed to be in the group. The associate input data 132 may be indicative of this input and may be provided to the facility management system 118. The facility management system 118 processes the associate input data 132 and generates group data 134. The group data 134 associates particular users 102 with a particular group. For example, the group data 134 may indicate that user 102(4) and user 102(5) are in a common group. Members of a common group may share a common identifier. For example, each user 102 may be affiliated with a particular user identifier. Each of these user identifiers may then be associated with a single common session identifier. For example, a table may store data that indicates "User 102(4), User 102(5), Group 12291" where "12291" is the group identifier, thus associating the two users 102 as being members of the same group.

Different implementations of the user interface 116 are described in more detail with regard to subsequent figures.

Users 102 within a group may be identified as discrete individuals but may not have their personal identities known by the facility management system 118. For example, a foreman of a work crew may have established credentials, registered with the facility management system 118, and setup a billing account. The workers operating under the direction of the foreman to assist in picking and placing items may not have such accounts. Upon entry into the facility, the foreman and the workers may be associated with a single group. As a result, the facility management system 118 may associate any resulting costs with the billing account of the foreman. Thus, when a worker picks an item from a shelf, the foreman may be billed for the cost of that item. In some implementations, a single user 102 may be deemed to be a group of one.

In some implementations, individual users 102 that are tracked within the facility may be assigned a particular identifier that distinguishes them from other users 102. For example, the user serial number may be issued to a particular user 102 following the scan of their entry credential data 122 at the gate 106. This user serial number may then later be associated with a particular account identifier, such as a discrete login for that particular user 102. Continuing the example, a group may comprise a set of user serial numbers.

One or more of the various functions described with regard to the modules of the facility management system 118 may in some implementations be performed by other systems. For example, another system may be configured to provide the entry credential data 122.

Figure 1A:
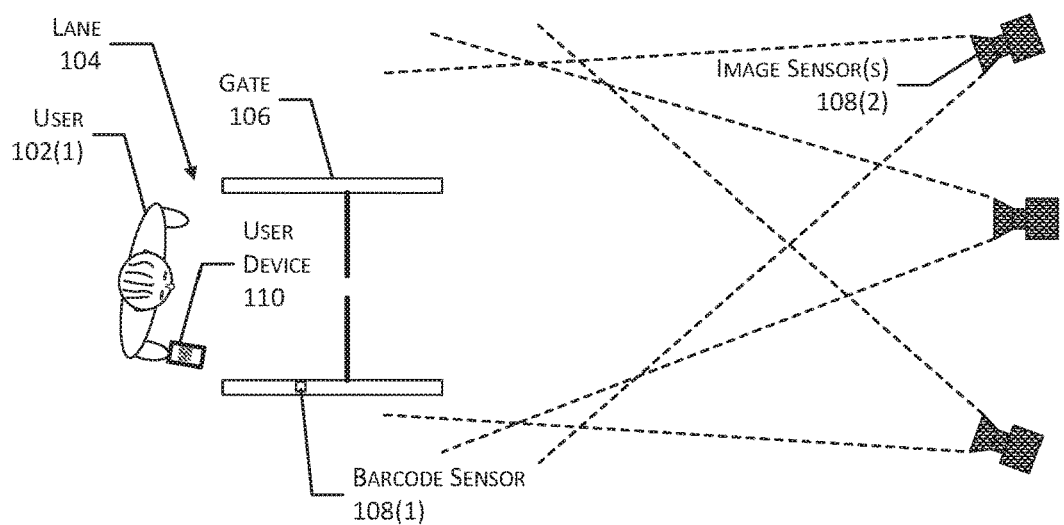
FIG. 1A illustrates a system to determine information about users entering the facility without an associate, according to some implementations.
Figure 1A:
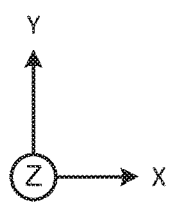

FIG. 1A illustrates a system 136 to determine information about users entering the facility without an associate 112, according to some implementations. In some implementations, no associate 112 may be present at the facility, and users 102 may enter and exit without interacting with an associate 112. As described above, identity of the user 102 may be obtained at least in part from one or more of entry credential data 122, the image data 128, or other sensor data.

Figure 1B:
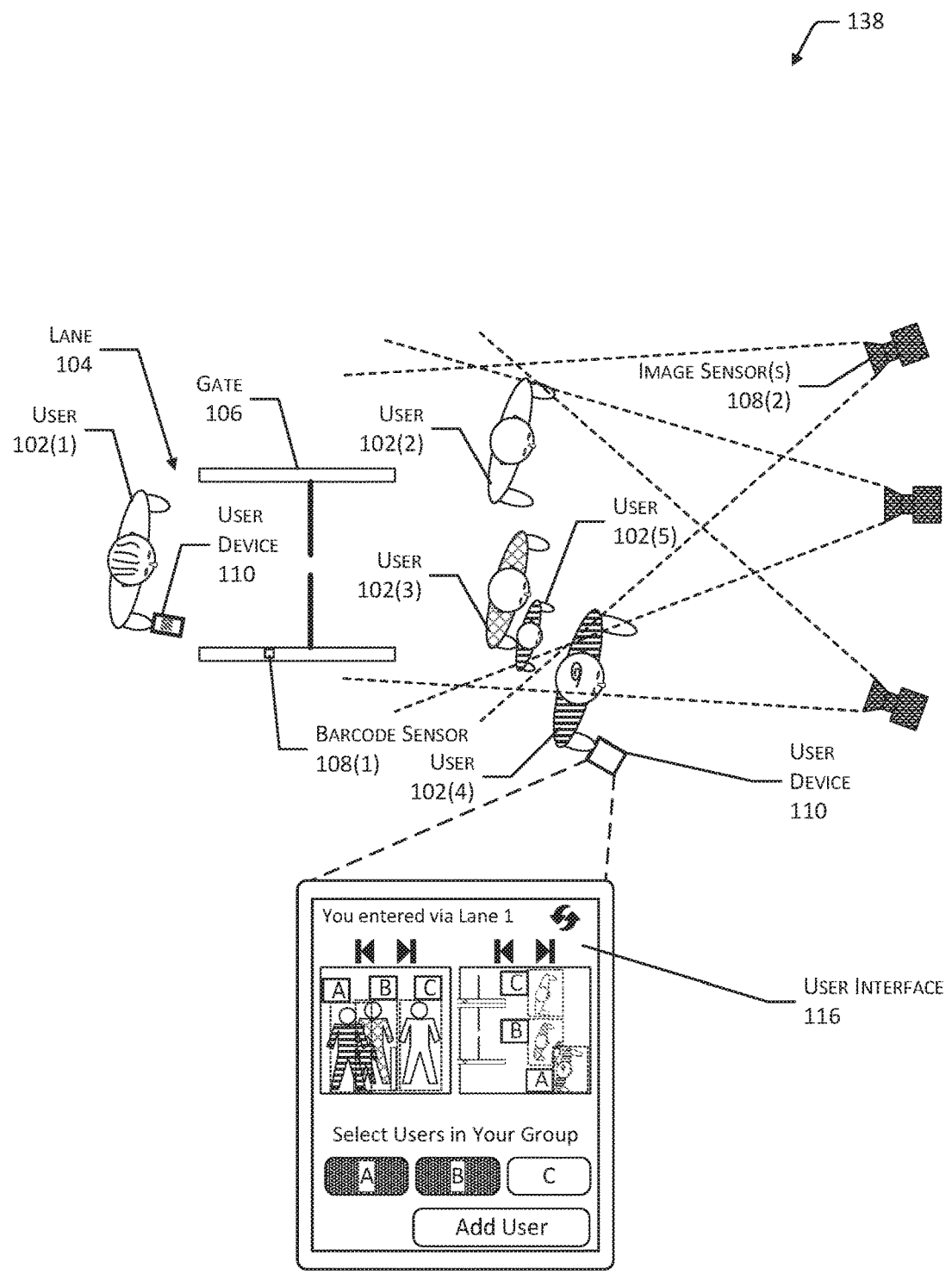
FIG. 1B illustrates a system to determine information about which users are members of a group, according to some implementations.

FIG. 1B illustrates a system 138 to generate group data 134 indicative of which users 102 are members of a group, according to some implementations. In some implementations, instead of, or in addition to gathering group data 134 from an associate 112, the users 102 may provide information to generate group data 134. For example, the user interface 116 may be presented on the user device 110 and used to acquire input from one of the users 102. The user 102 may provide information that indicates they are part of a group, or may provide information they are not affiliated with another group. For example, the user 102 may enter into the user interface 116 on the user device 110 that they are alone. An alert or notification may be sent to the application providing the user interface 116 on the user device 110 of a particular user 102. For example, user 102(4) may receive a notification on their smartphone about some ambiguity as to who is part of their group in the facility. The user 102(4) may access the user interface 116 and provide information used to generate group data 134. Contemporaneously, other users 102 may also be prompted to provide information by way of the user interface 116. For example, the user 102(3) may also receive a notification on their smartphone. Preliminary group data 134 based on input from several users 102 may be analyzed and used to generate final group data 134. For example, group data 134 that is consistent with input obtained from two different users 102 may be deemed to be the final group data 134.

In some implementations, the user interface 116 may be presented on computing devices accessible within the facility. For example, touchscreen displays to present the user interface 116 may be arranged on pedestals within an entry area, on gates 106, mounted to walls, and so forth. Users 102, associates 112, or both may then utilize these computing devices to provide input via the user interface 116.

Figure 2:
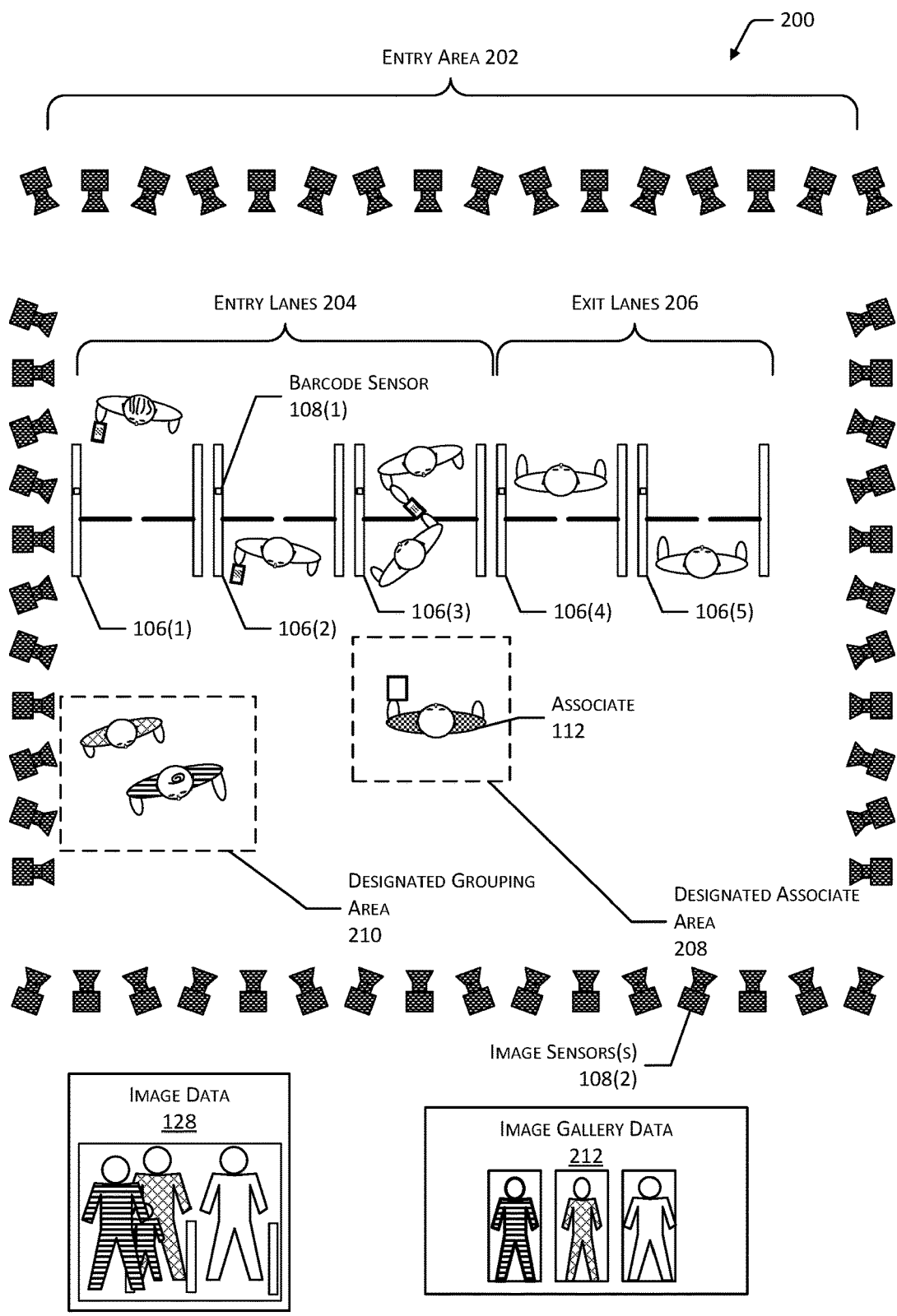
FIG. 2 illustrates an overhead view of an entry area which includes various sensors and an associate to facilitate acquisition of data about users entering the facility, according to some implementations.

FIG. 2 illustrates an overhead view 200 of an entry area 202 which includes various sensors 108. The entry area 202 may include a plurality of image sensors 108(2). In one implementation, each lane 104 may be within the field of view of at least three cameras. Other sensors 108, such as the barcode sensors 108(1) may also be present.

In some implementations, the lanes 104 may be reconfigurable to operate in an entry mode, an exit mode, or an entry and exit mode. As depicted here, gates 106(1)-(3) are configured as entry lanes 204 while gates 106(4) and 106(5) are configured as exit lanes 206. During normal operation of the facility, users 102 may enter by way of the entry lanes 204 and leave by way of the exit lanes 206. In one implementation, the gate 106 may comprise a gate manufactured by Orion Entrance Control Inc. of Laconia, N.H., USA. For example, gate 106 may comprise an optical barrier swing gate design with transparent moveable members to permit or deny passage and the barcode sensor(s) 108(1) may be integrated into the pedestals along with other sensors 108. For example, instead of or in addition to the barcode sensor 108(1), a near field communication (NFC) reader may be incorporated into the gate 106. For example, the entry credential data 122 may be transmitted using NFC or Bluetooth®.

In other implementations, the entry lanes 204, exit lanes 206, or both may omit the gates 106, instead using other devices to obtain the entry credential data 122. For example, pedestals may be positioned in the entry area 202 that include barcode sensors 108(1). In some implementations, the entry lanes 204, exit lanes 206, or both may be delineated using indicia on the floor, such as particular colored tiles. In other implementations, the entry lanes 204, exit lanes 206, or both may be delineated using furnishings or decorative items. In yet other implementations, the entry lanes 204, exit lanes 206, or both may not be explicitly delineated, instead providing an area for passage of the users 102.

The entry area 202 may be configured to facilitate operation of the sensors 108. For example, light baffles such as walls, tinted windows, and so forth, may be arranged such that the image sensors 108(2) are not impaired by natural light coming in through windows or doors.

As described above, the user 102 approaches a lane 104 and uses the user device 110 to provide entry credential data 122 to a scanner in the lane 104, such as a barcode sensor 108(1) as part of a gate 106. The gate 106 may have a movable member that may be selectively opened or closed to permit or deny, respectively, physical entry to the facility. In one implementation, the gate 106 may prevent physical entry until the entry credential data 122 has been authorized. For example, the gate 106 may open after receiving data from the facility management system 118 indicative of valid entry credential data 122. In another example, the gate 106 may open after receiving the entry credential data 122 but without confirming whether that entry credential data 122 is valid. Continuing this example, should the entry credential data 122 later be determined to be invalid, an associate 112 may be dispatched to interact with the invalid user 102. This interaction may include registering the user 102, escorting them from the facility, and so forth. In another implementation, the gate 106 may remain closed until directed by an associate 112. For example, presentation of improper entry credential data 122 may result in the associate 112 being summoned or directed to a particular gate 106. The associate 112 may then assess the situation and determine if entrance should be permitted. If entrance is permitted, the associate 112 may activate a control to open the gate 106 and allow the user 102 to enter the facility. If entrance is not permitted, the gate 106 may remain closed, and the associate 112 may escort the user 102 from the facility.

Entry to the facility may be restricted to users 102 who otherwise possess valid entry credential data 122. For example, if the number of people within the facility is within a threshold value of a maximum occupancy capacity of the facility, entrance may be denied until some users 102 leave. In another example, users 102 may not be permitted to enter during particular times or when particular operations are taking place, such as during movement of machinery, cleaning, and so forth.

Authorization of the entry credential data 122 may be performed in some implementations by the computing device controlling the gate 106. The gate 106 may be connected to a network and receive pre-authorization data indicative of what entry credential data 122 will be deemed valid. For example, pre-authorization data may include a list of accepted token values, inputs for an algorithm used to determine if the entry credential data 122 is valid, and so forth. The gate 106 receives the entry credential data 122 using the barcode sensor 108(1). The gate 106 may then determine that the entry credential data 122 is authorized using the pre-authorization data. Responsive to this determination, the gate 106 may open the movable member to allow the user 102 to enter the facility. The gate 106 may then generate the lane data 124 and send the lane data 124 to the facility management system 118.

In some implementations, the facility management system 118 may process the image data 128 to determine one or more gestures associated with presentation of the user device 110 to the barcode sensor 108(1). For example, the computer vision algorithm may be used to process the image data 128 to determine that a portion of the image data 128 that corresponds to an area near the barcode sensor 108(1) has changed from a first time to a second time. This change may be the result of a "swipe" or passage of the user device 110 near the barcode sensor 108(1). Continuing the example, the change may comprise a sequence of images that depict a change in the pixels of an area corresponding to the barcode sensor 108(1) that exceed a threshold value. The computer vision algorithm may utilize object recognition to recognize one or more of the hand of the user 102 or the user device 110. In other implementations, other techniques may be used to recognize a particular gesture made by the user 102. A time associated with the gesture of the "swipe" may be determined, such as a timestamp of one or more of the image data 128. If the time associated with the gesture is within a threshold period of time at which data was obtained by the barcode sensor 108(1), the facility management system 118 may use this information to confirm that a user 102 was present at the gate 106 when the entry credential data 122 was presented. In some implementations, the generation of the image gallery data 212 may be based at least in part on the information indicative of the gesture associated with presenting the user device 110 at the gate 106. For example, the image gallery data 212 may comprise the image data 128 that are within one second of a time of the gesture associated with presenting the user device 110 to the barcode sensor 108(1).

In a situation where the user 102 is part of a group, the user 102 may pass back their user device 110 to the other members of the group for them to use to scan enter the facility. Alternatively, the user 102 with the user device 110 may pass their user device 110 across the barcode sensor 108(1) multiple times to correspond to the number of users 102 in the group. Continuing the example, if there are three users 102 in the group, the user 102 may scan their user device 110 three times. As each of the users 102 in the group pass through the gate 106, they are associated with the group of the first user 102(1).

The facility management system 118 may be configured to avoid adding the associate 112 to a group of users 102. For example, there may be a designated associate area 208 within the entry area 202. Persons that are standing within this designated associate area 208 may be prevented from being automatically added to the group. In some implementations, the associate 112 may be recognized based on a tracking device, visual indicia, and so forth. For example, the associate 112 may have a name tag or identification card that includes one or more features that are distinguishable within the image data 128. Continuing the example, the name tag may include a barcode, may have a particular color, and so forth.

Grouping of users 102 may also be facilitated by the use of one or more designated grouping areas 210 present within the entry area 202. For example, either the entry area 202 before or after the gates 106 may be designated grouping area 210. The designated grouping area 210 may include a section of flooring. When more than one user 102 stands within the designated grouping area 210, the analysis module 126 may determine those users 102 to be members of a common group. In another implementation, the user 102 may provide input using the user device 110 to indicate the number of individuals in their group. This information may then be used by the analysis module 126 to determine the group data 134.

During operation of the facility, users 102 pass in and out of the facility at the lanes 104 generally without personal interaction with the associate 112. However, in the event of a low confidence determination by an automated system, the associate 112 may be called upon to use the user interface 116 of the associate device 114 to provide associate input data 132. The associate 112 may generate the associate input data 132 based on a review of sensor data presented within the user interface 116, personal observation, as a result of conversation with the user 102, and so forth. For example, if a second user 102(2) should enter the facility by tailgating behind the first user 102(1), the associate 112 may approach the second user 102(2) and ask the second user 102(2) to re-enter or present entry credential data 122.

As described above, the image data 128 may comprise images obtained from one or more of the image sensors 108(2) in the entry area 202. The image data 128 may comprise still images, video clips, live stream data, and so forth. The facility management system 118 may generate image gallery data 212. The image gallery data 212 may comprise at least a portion of the sensor data obtained by the sensors 108 within the facility. For example, the image gallery data 212 may include images of the user 102 that have been cropped to depict just that user 102. The cropping may be performed manually, automatically, or as a combination of manual and automatic operation. For example, the manual cropping may be performed in response to the input of an associate 112, Continuing the example, the automatic cropping may utilize image processing techniques to recognize a user's 102 head and crop the image around where the head is.

The image gallery data 212 may also present other information such as a name of the user 102, image data 128 obtained during registration of the user 102, and so forth. In some implementations, the image gallery data 212 may comprise images obtained in the entry area 202 at the time of entry. For example, the image gallery data 212 may comprise images of the user 102 obtained contemporaneously with their presentation of the user device 110 at the gate 106. The image gallery data 212 may include images of different users 102, images of the same user 102 but obtained from different cameras, and so forth. The image gallery data 212 provides a reference point of known information that may be subsequently used by the associate 112 or the facility management system 118.

Figure 2A:
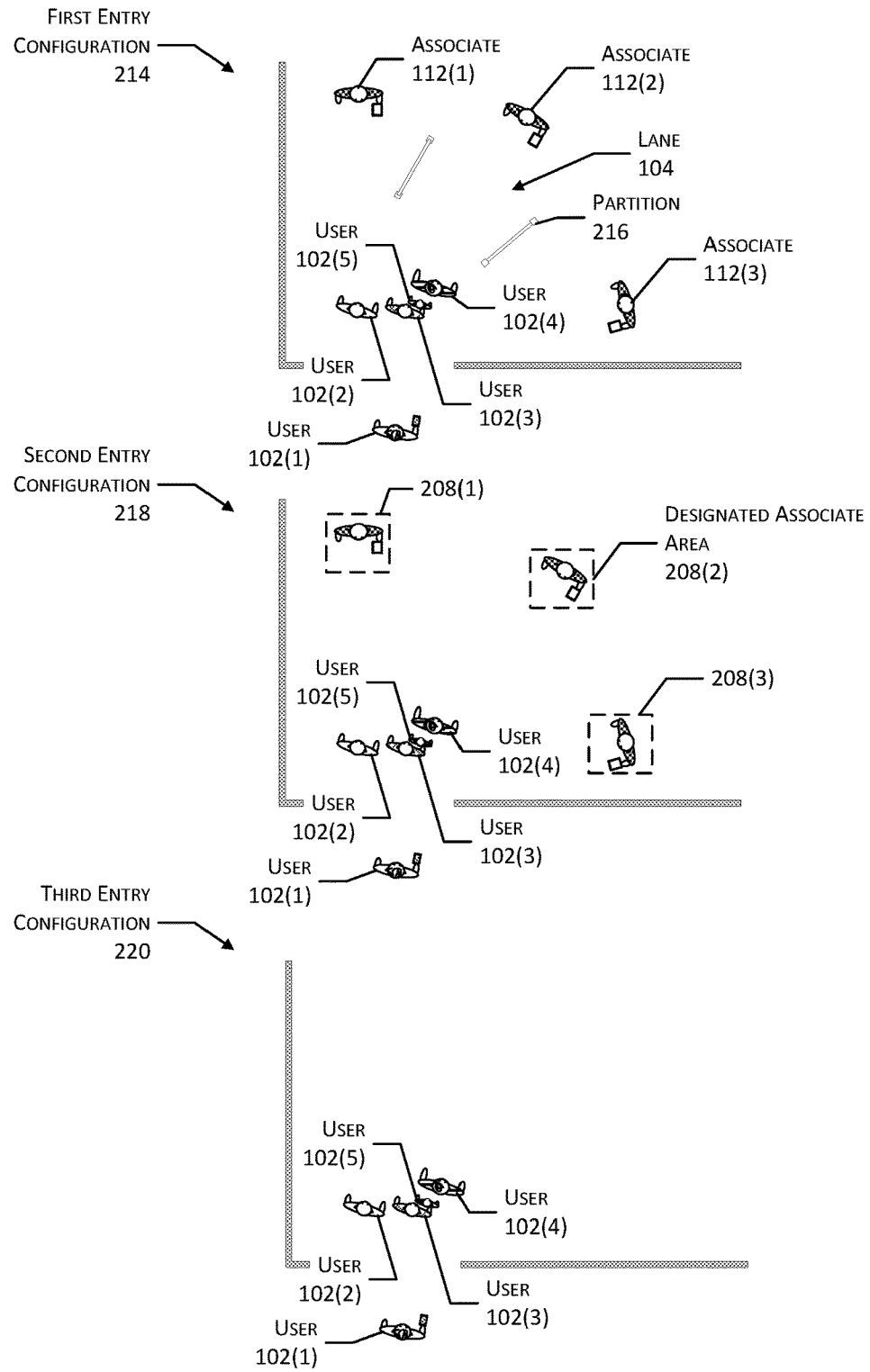
FIG. 2A depicts three possible configurations of an entry area, according to some implementations.

FIG. 2A depicts three possible configurations of an entry area 202, according to some implementations. A first entry configuration 214 depicts the use of partitions 216 to form lanes 104. As depicted here, two partitions 216 may be placed in an approximately arcuate layout to form three lanes 104. As users 102 enter the facility, they are directed to pass through one of the lanes 104. In some implementations, these partitions 216 may include one or more sensors 108, while in other implementations, the partitions 216 may omit sensors 108 and comprise inert furniture without electronics. A particular associate 112 may be tasked with handling users 102 entering through a particular lane 104. For example, a first associate 112(1) may be responsible for assisting the entry of users 102 passing through a first lane 104(1), while a second associate 112(2) is responsible for the users 102 passing through a second lane 104(2), and so forth. The associate devices 114 may be handheld, free standing, mounted to an article of furniture, and so forth.

A second entry configuration 218 depicts an open floor plan in which no gates 106 or partitions 216 are present within the entry area 202. Associates 112 are arranged within the entry area 202 to assist users 102 who are entering. In some implementations, the associates 112 may be affiliated with a designated associate area 208. For example, associate 112(2) may be designated to stand within the designated associate area 208(2). The associate 112 may not be restricted to remain within the designated associate area 208(2). For example, the associate 112 may move around in the entry area 202 as needed to assist users 102. Once assistance is complete, the associate 112 may return to the designated associated area 208.

A third entry configuration 220 depicts an open floor plan in which no gates 106, partitions 216, or associates 112 are present in the entry area 202. In this implementation, users 102 enter the facility without being constrained to a particular lane 104. The entry credential data 122 may be obtained wirelessly. For example, the user device 110 may wirelessly transmit the entry credential data 122 to a sensor 108 in the facility. In another example, the image data 128 may be processing using facial recognition techniques to identify the user 102. In some implementations, data from multiple sensors 108 may be used to determine the identity of the users 102 entering the facility.

Illustrative User Interfaces

Figure 3:
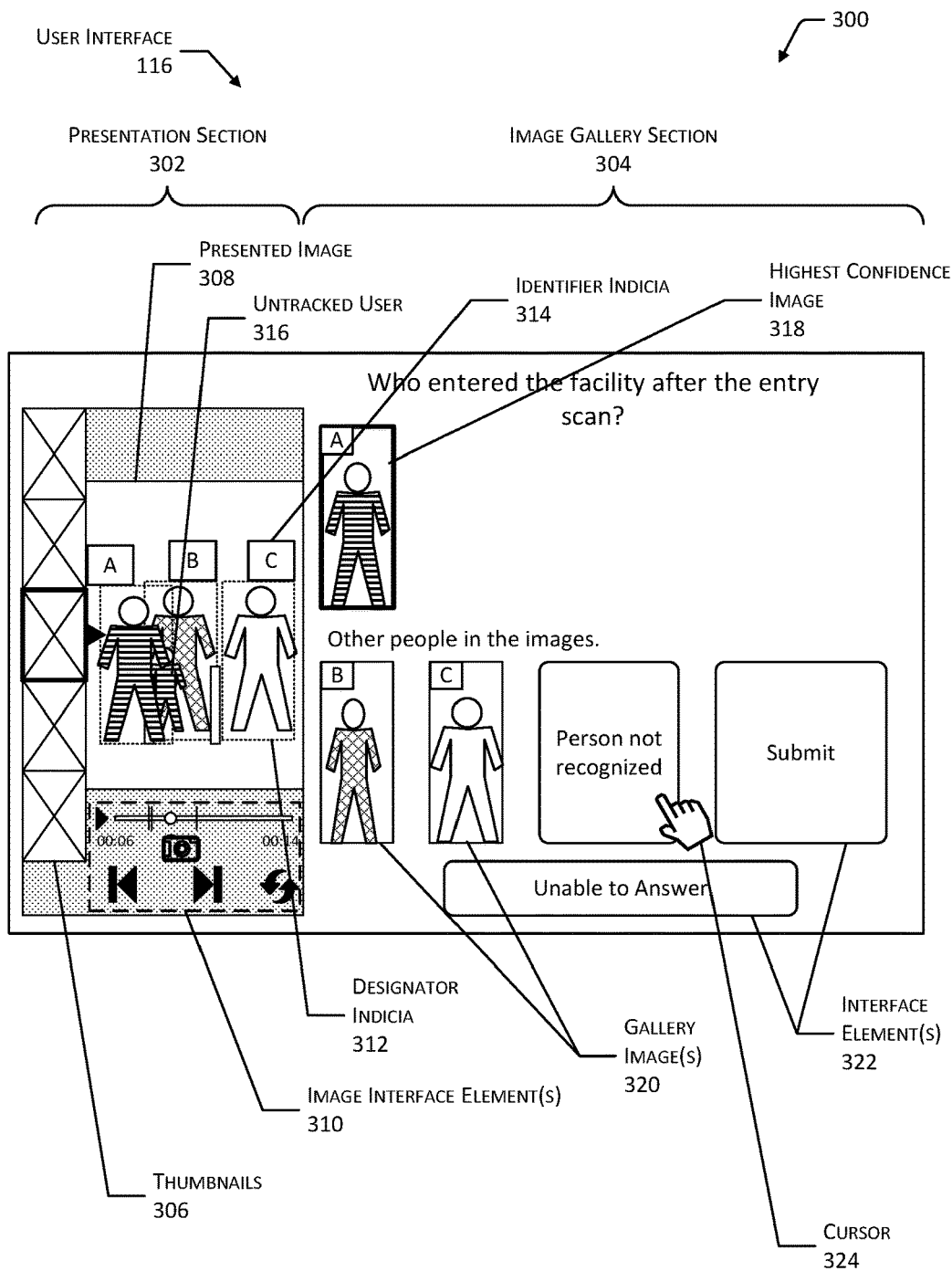
FIG. 3 depicts an illustration of a user interface to assist in identification of a user entering the facility, according to some implementations.

FIG. 3 depicts an illustration 300 of the user interface 116 configured to assist in identification of a user 102 entering the facility, according to some implementations. The user interface 116 depicted here may be presented on the associate device 114, or on another computing device. The presentation data 130 may be used to cause the display on the associate device 114 of this and the other user interfaces 116 described herein.

The user interface 116 may include a presentation section 302 and an image gallery section 304. The user interface 116 may present information that is associated with a low confidence event, such as an ambiguity as to identification of a user 102 who has entered the facility.

The presentation section 302 may include different portions of the image data 128. For example, a plurality of thumbnails 306 are depicted. Selection by the associate 112 of one of these thumbnails 306 may result in their presentation as a presented image 308. The presented image 308 may comprise still images, video clip, live stream, and so forth. For example, where the presented image 308 comprises a video clip, the video clip may be configured to play once and then stop, repeat indefinitely until paused, rock back and forth (wherein the video is presented in normal sequence and then presented in reversed sequence with image appears to be going backwards), and so forth. The image data 128 presented in the presentation section 302 may be image data 128 that is associated with a particular time, particular location within the facility, and so forth. For example, in this illustration, identification of the user 102 that entered the facility has a low confidence value and is presented to the associate 112 for resolution. The image data 128 presented in the presentation section 302 depicted here comprises image data 128 that was obtained contemporaneously with the scan of the entry credential data 122 in the vicinity of the location within the entry area 202 where the gate 106 is located.

One or more image interface elements 310 may be present within the user interface 116. The image interface elements 310 include, but are not limited to, one or more of a time index control, a pause control, a play control, a rewind control, a fast-forward control, a refresh control, a change camera control, and so forth. For example, the image interface elements 310 may allow the associate 112 to manipulate the video clip, view image data 128 from a different camera, and so forth. The time index control may allow the user 102 to change presentation to different portions of the image data 128, such as different times within the video clip. In some implementations, the image interface elements 310 may be visible control icons such as depicted here. In other implementations, image interface elements 310 may comprise gestures. For example, a swipe to the left may rewind while a swipe the right may fast forward through the video clip that is presented as the presented image 308.

The image interface elements 310 may present additional information obtained from other sensors 108. In one implementation, the time index control may be used to present timeline data. For example, vertical lines may be used to indicate when entry credential data 122 was scanned by the barcode sensor 108(1) at the gate 106. Additional information may also be presented. In another example, visual indicia such as color, icons, text, and so forth, may be used to indicate the number of times the same set of entry credential data 122 were received, and so forth. Continuing this example, two vertical lines of the same color, with the same label, and so forth, as presented on the time index control may indicate the scan of the same code occurred twice.

Selection of the initial image data 128 to be presented within the presented image 308 may be automatic or manual. For example, the facility management system 118 may attempt to determine a video clip in which the image has the least amount of blurriness. This video clip may then be presented first as the initial presented image 308 of the presentation section 302. In another example, each lane 104 may be associated with a default camera, and the presented image 308 may be image data 128 obtained by the default camera. In yet another example, a particular associate 112 may specify a preferred camera from which image data 128 is to be initially presented as the presented image 308.

Overlaid onto the presented image 308, or otherwise incorporated therewith may be other information generated by the facility management system 118. Designator indicia 312 may be associated with the depiction of a user 102 within the image data 128. The designator indicia 312 may be indicative of detection of a particular object in the image data 128. For example, the designator indicia 312 may comprise a bounding box that surrounds an object appearing within the image data 128 that has been determined by a computer vision algorithm or manual input as being a person. In another example, the designator indicia 312 may comprise a change in background color of the image as presented, an icon presented adjacent to the object, an arrow, a visual effect, an outline, and so forth. Continuing the example, the visual effect may comprise blurring, highlighting, changing contract, changing coloring, and so forth. In one implementation, the area around the object may be blurred leaving the object unblurred.

Identifier indicia 314 may also be presented within the presented image 308. The identifier indicia 314 provides a human-readable designation that differentiates one user 102 from another user 102. The identifier indicia 314 may comprise text, an icon, graphic, and so forth. The identifier indicia 314 may be independent of an actual identification of the user 102. For example, as depicted here, the identifier indicia 314 comprise sequential alphabetic characters. In other implementations, the identifier indicia 314 may be associated with actual identification, such as a username, first name, surname, and so forth.

Presence of the designator indicia 312 in the user interface 116 may be used as a visual cue to the associate 112 that a user 102 has been recognized as a user 102. Presence of the identifier indicia 314 in the user interface 116 may be used as a visual cue to the associate 112 that a user 102 has been identified and is being tracked.

By using the information overlaid on the presented image 308, the associate 112 is able to quickly make decisions with regard to particular situations. For example, in this illustration, an untracked user 316 is present. The associate 112 is able to determine that the user 102 is untracked because there is no designator indicia 312 or identifier indicia 314 presented in the user interface 116 with respect to that person.

In the situation depicted here in FIG. 3, the associate 112 is being asked to help determine who entered the facility after the entry scan. The image gallery section 304 may be used to present at least a portion of the image gallery data 212. As described above, the image gallery data 212 may include gallery images 320 obtained at a particular time, location, and so forth. In this illustration, the image gallery data 212 presented in the image gallery section 304 includes gallery images 320 of the users 102 obtained at their entry to the facility. In some implementations, the image gallery data 212 may include information obtained from earlier, such as during previous visits to the facility, during a registration process, and so forth.

In situations where the facility management system 118 has made a determination, information about that determination may be used to determine placement of one or more elements within the user interface 116. For example, the associate 112 has been prompted to use the user interface 116 to resolve a low confidence identification. A highest confidence image 318 may be presented more prominently, such as higher up within the user interface 116, at a size that is larger than other images, with the border or other visual indicia for emphasis, and so forth. In some implementations, the image data 128 having the highest confidence value may be automatically selected. If the low confidence determination is actually correct, the associate 112 may then use an interface element 322 to submit the information. However, if the selection is incorrect or needs further amendment, the associate 112 may activate one or more other interface elements 322 to make the changes that are necessary. The interface elements 322 may comprise graphical elements such as invisible controls, buttons, sliders, combo boxes, list boxes, radio buttons, and so forth. Invisible controls may comprise controls that are associated with another element in the user interface 116, such as the designator indicia 312, the identifier indicia 314, and so forth. For example, the designator indicia 312 may be displayed, providing output to the person using the user interface 116. In another example, the designator indicia 312 may be associated with an invisible control that is manifested within the boundary of the designator indicia 312. In the situation where a touchscreen is used, by touching within the border of the designator indicia 312, the person may activate or deactivate the selection of the particular user 102 associated with the designator indicia 312 as being a member of a group.

Continuing the example depicted in FIG. 3, a cursor 324 is shown selecting the "Person not recognized" interface element 322. The cursor 324 in this and the following figures corresponds to a location of a touch of the associate 112 on a touchscreen device, selection using a mouse, and so forth. The user interface 116 presented on the associate device 114 may omit a visual representation of the cursor 324. After selection of this interface element 322, the image data 128 may be further processed with different computer vision algorithms to find the other person depicted in the image. Instead of this automated process, or in addition to it, the associate 112 may be presented with another user interface 116 to manually designate the user 102 who is not recognized and delineate them within the image data 128.

In other implementations, other information may be presented within the image gallery section 304. For example, a first name or last name of the user 102 depicted in each of the gallery images 320 may be presented.

By using the user interface 116, the associate 112 may be able to quickly and easily provide associate input data 132 to the facility management system 118. As a result, the facility management system 118 may be able to quickly maintain information about the operation of the facility and the actions of the users 102 therein.

In one implementation, the user interface 116 may be used to facilitate tracking of the user 102 within the facility. For example, in a crowded situation, the analysis module 126 may be unable to distinguish between different users 102. The user interface 116 may be used to acquire associate input data 132 that is indicative of where in a given set of image data 128 individual users 102 are. In some implementations, the associate 112 may also provide information to identify the users 102 that are depicted in the given set of image data 128.

Figure 4:
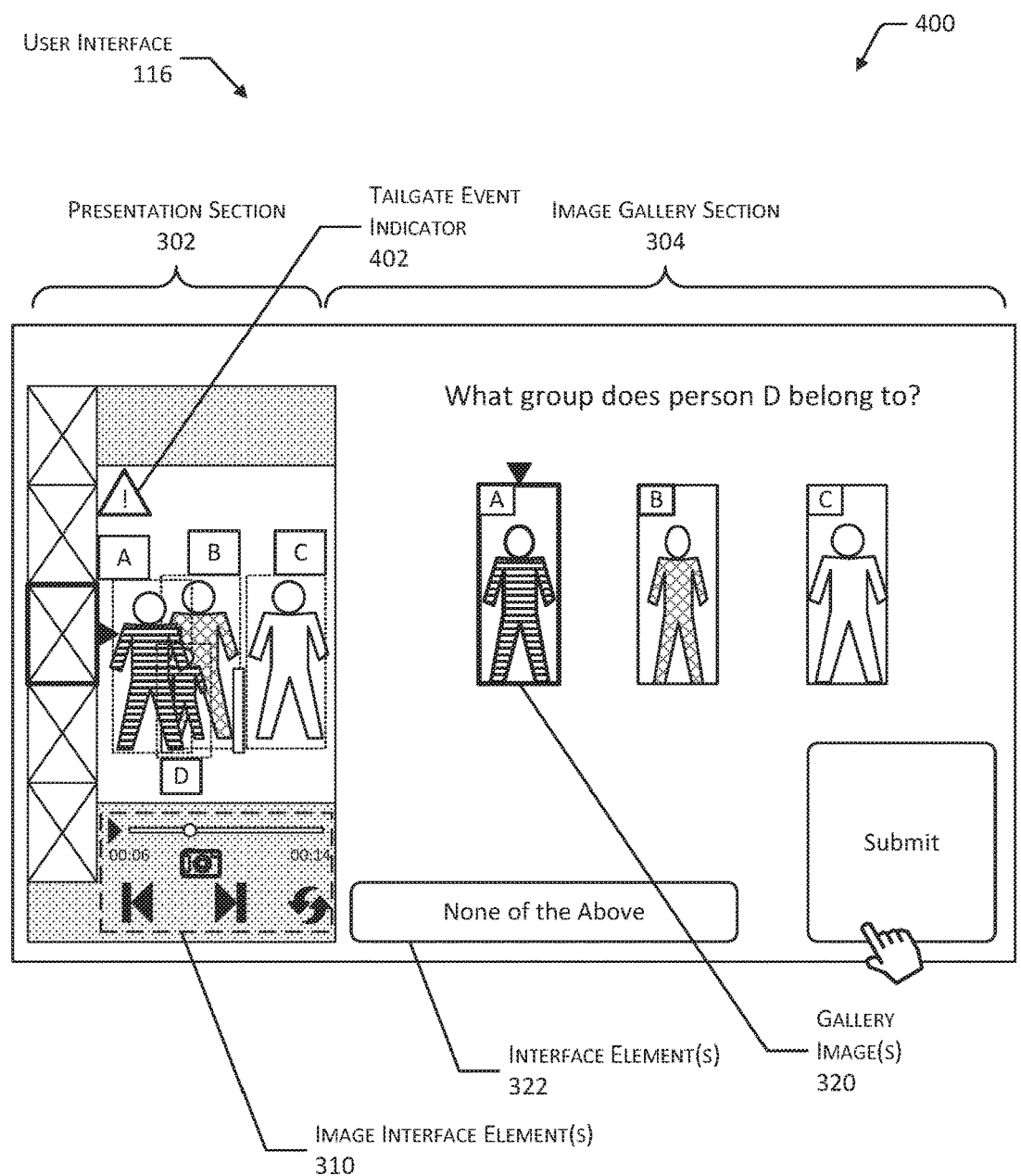
FIG. 4 depicts an illustration of a user interface to acquire input used to determine group data about users entering the facility, according to some implementations.

FIG. 4 depicts an illustration 400 of the user interface 116 configured to acquire group data 134 about users 102 entering the facility, according to some implementations. The user interface 116 depicted here may be presented on the associate device 114 or on another computing device.

By way of illustration, and not necessarily as a limitation, the user interface 116 depicted in FIG. 4 may be presented after the associate 112 has selected the "Person not recognized" interface element 322 described above in FIG. 3.

In some situations, the facility management system 118 may call upon the assistance of the associate 112 to determine the group data 134. In this illustration, the presentation section 302 and the image gallery section 304 are depicted similar to those described above. In this illustration, the gallery images 320 within the image gallery section 304 are sorted left to right in descending order of confidence determined by an automated system. For example, the facility management system 118 may have determined that user "D" has a confidence value of 0.2 of being grouped with user "A", a confidence value of 0.15 of being grouped with user "B", and a confidence value of 0.05 of being grouped with user "C". The gallery images 320, or other portions of the user interface 116, may be configured to act as interface elements 322. For example, by touching or clicking on a particular gallery image 320, the associate 112 may be able to select or deselect that user 102 as being a member of the group.

In some implementations, such as depicted here, predicted members of the group are determined by the facility management system 118 and may be indicated by way of a change of border color, other visual indicia, relative placement within the image gallery section 304, and so forth.

The associate 112 may use the various image interface elements 310 to review the image data 128 associated with the entrance of these users 102. The associate 112 may then provide input by activating one or more of the interface elements 322. For example, if the associate 112 believes the user "D" is part of a group with user "A" (which has been pre-selected), the associate 112 may activate the submit interface element 322. As a result, associate input data 132 indicative of this determination is sent from the associate device 114 to the facility management system 118 for further processing. Continuing the example, the group data 134 may be updated to confirm that user "A" and user "D" are members of the same group.

In one implementation, the user interface 116 may be used to generate group data 134 after sensor data is determined to exceed a threshold value during entry of the user 102. The facility management system 118 may determine a count of scans of the same entry credential data 122 that are made within a predetermined period of time. For example, the count of scans may be indicative of the number of times the barcode sensors 108(1) in the entry area 202 received the same entry credential data 122. A low confidence event may be determined when the count of scans is greater than a threshold, such as one. For example, a group of users 102 may pass along the user device 110 such that each user 102 is able to scan the same entry credential data 122 and pass through the gate 106. Responsive to the count of scans being greater than a threshold, the facility management system 118 may cause the display on the associate device 114 of the user interface 116 such as that depicted in FIG. 4. Group data 134 may then be obtained based on the associate the data 132 that is received.

In another implementation, the user interface 116 may be used to generate group data 134 after sensor data is determined to exceed a threshold value during entry of the user 102. The gate 106 may determine a count of users 102 entering, and this information may be included in the lane data 124. For example, the gate 106 may include one or more infrared emitters such as light emitting diodes and infrared detectors that are used to determine how many people have passed through the gate 106. The system may be configured such that one person is expected to pass with each distinct scan of the entry credential data 122. If two people pass through the gate 106 after a single scan of the entry credential data 122, this may be indicative of tailgating.

The system may determine the first lane data 124(1) is indicative of a count of users 102 entering with the same entry credential data 122 exceeds a threshold value. For example, two people have passed through the gate 106 after a single scan of the entry credential data 122. Presence of a representation of one or more additional users 102 depicted in the first image data 128 may be determined. For example, the analysis module 126 may process the first image data 128(1) to determine a count of the faces present at the lane 104 at the time corresponding to the acquisition of the lane data 124.

Responsive to the determination of the count of users 102 using the same entry credential data 122 exceeds a threshold value, the facility management system 118 may cause the display on the associate device 114 of the user interface 116 such as that depicted in FIG. 4. Group data 134 may then be obtained based on the associate input data 132 that is received. For example, the associate 112 may generate associate input data 132 that is indicative of a group relationship between the first user 102(1) and at least some of the one or more additional users 102 who passed through the gate 106 with the first user 102(1). The identifier associated with the entry credential data 122 may then be associated with the users 102 in the group.

Other information may also be presented within the user interface 116. In one implementation, a tailgate event indicator 402 may be presented that notifies the associate 112 that a possible tailgating event occurred at a particular lane 104. The possible tailgating event may be generated based at least in part on the lane data 124 obtained from the gate 106. For example, the tailgate event indicator 402 may comprise an icon such as a triangle with an exclamation point within.

Figure 5:
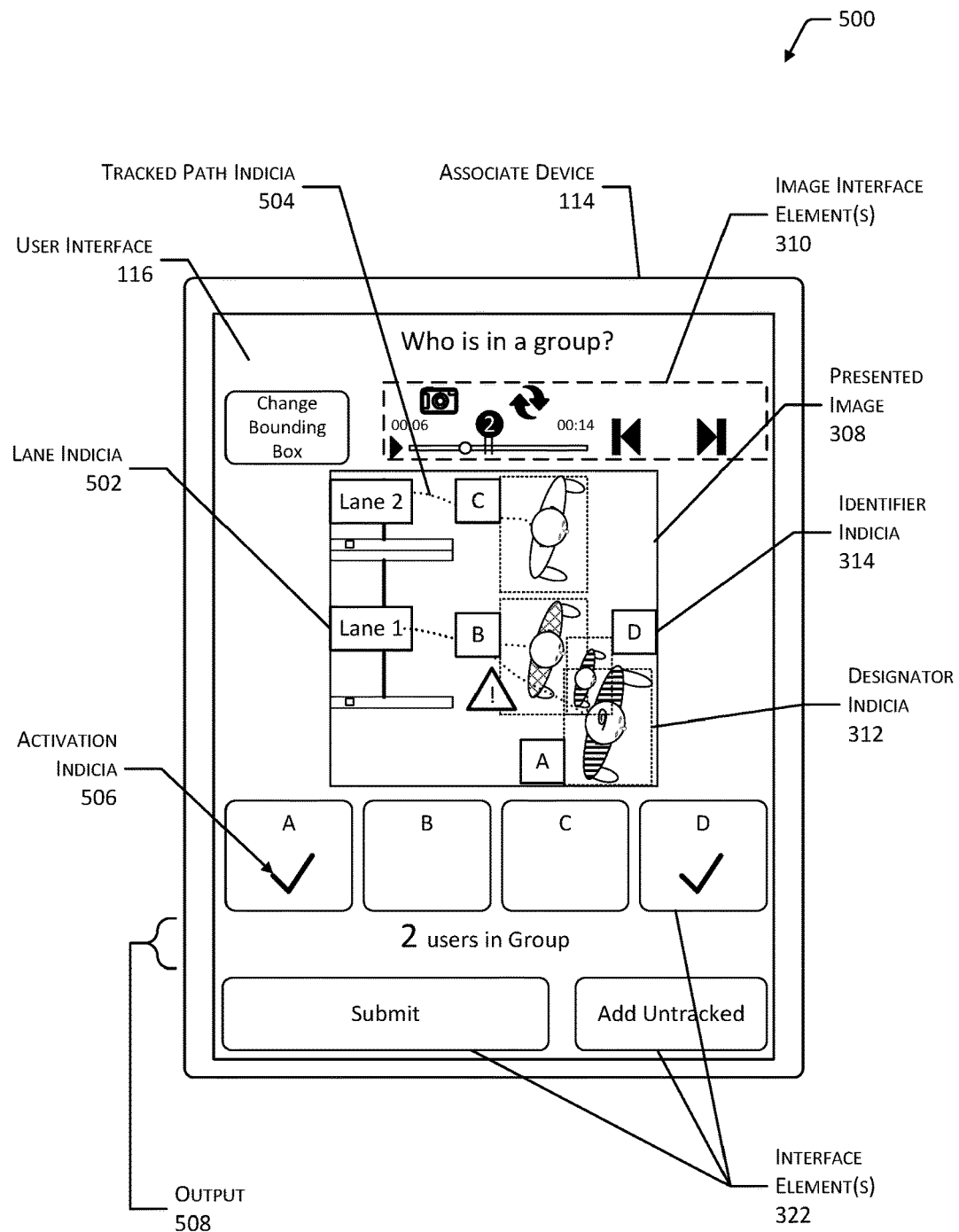
FIG. 5 depicts an illustration of a user interface to acquire input used to determine group data about users entering the facility, according to some implementations.

FIG. 5 depicts an illustration 500 of the user interface 116 configured to acquire associate input data 132 usable to generate or confirm group data 134 about users 102 entering the facility, according to some implementations. For example, the associate 112 is queried by way of the user interface 116 about whom they believe is in a group. The user interface 116 depicted here may be presented to the associate 112 by the associate device 114 or on another computing device.

The user interface 116 may include the image interface elements 310 described above. For example, a time index control may present timeline data such as indicating the time at which the same set of entry credential data 122 was presented twice at the gate 106. In this user interface 116, the presented image 308 comprises an overhead view of at least a portion of the entry area 202. Overlaid onto the presented image 308 may be other information such as lane indicia 502, tracked path indicia 504, and so forth. For example, the lane indicia 502 provides a visual indicator of each of the lanes 104 that are within the presented image 308. This provides spatial cues that may assist the associate 112 in providing an answer to a query. The tracked path indicia 504 may comprise an indication of where a particular user 102 has been within the facility. For example, tracked path indicia 504 may resemble a trail of breadcrumbs that show which lane 104 the user 102 is proceeding from.

The presented image 308 also includes an overlay presenting information such as the designator indicia 312 and the identifier indicia 314. The associate 112 may use one or more of the interface elements 322 to select which of the users 102 they believe are members of a single group. In this illustration, the associate 112 has determined that user's A and D are members of the same group, and has selected the appropriate interface elements 322 that correspond with the identifier indicia 314. Once selected, activation indicia 506 are presented. For example, a checkmark may be displayed within each of the control buttons that correspond to selected identifier indicia 314.

Following selection of one or more of the designator indicia 312 or the identifier indicia 314 using the interface elements 322, output 508 may also be presented. For example, the output 508 in FIG. 5 indicates there are currently two users 102 selected as being in a group.

Other controls may also be present within the user interface 116. For example, a change bounding box interface element 322 may allow the associate 112 to change the boundaries associated with the designator indicia 312.

As described above, in some implementations, the members of a group may be pre-selected based on a determination made by the facility management system 118. For example, the user interface 116 may have been initially presented to the associate 112 depicting group data 134 indicative of the highest confidence value determined by the automated system, that of user "A" and user "B". The associate 112 may then either confirm this or may modify based on their assessment of the information presented in the user interface 116.

In some implementations, the image gallery section 304 (not shown here) may also be presented. For example, activation of an image interface element 310 may result in presentation of the image gallery section 304.

Figure 6:
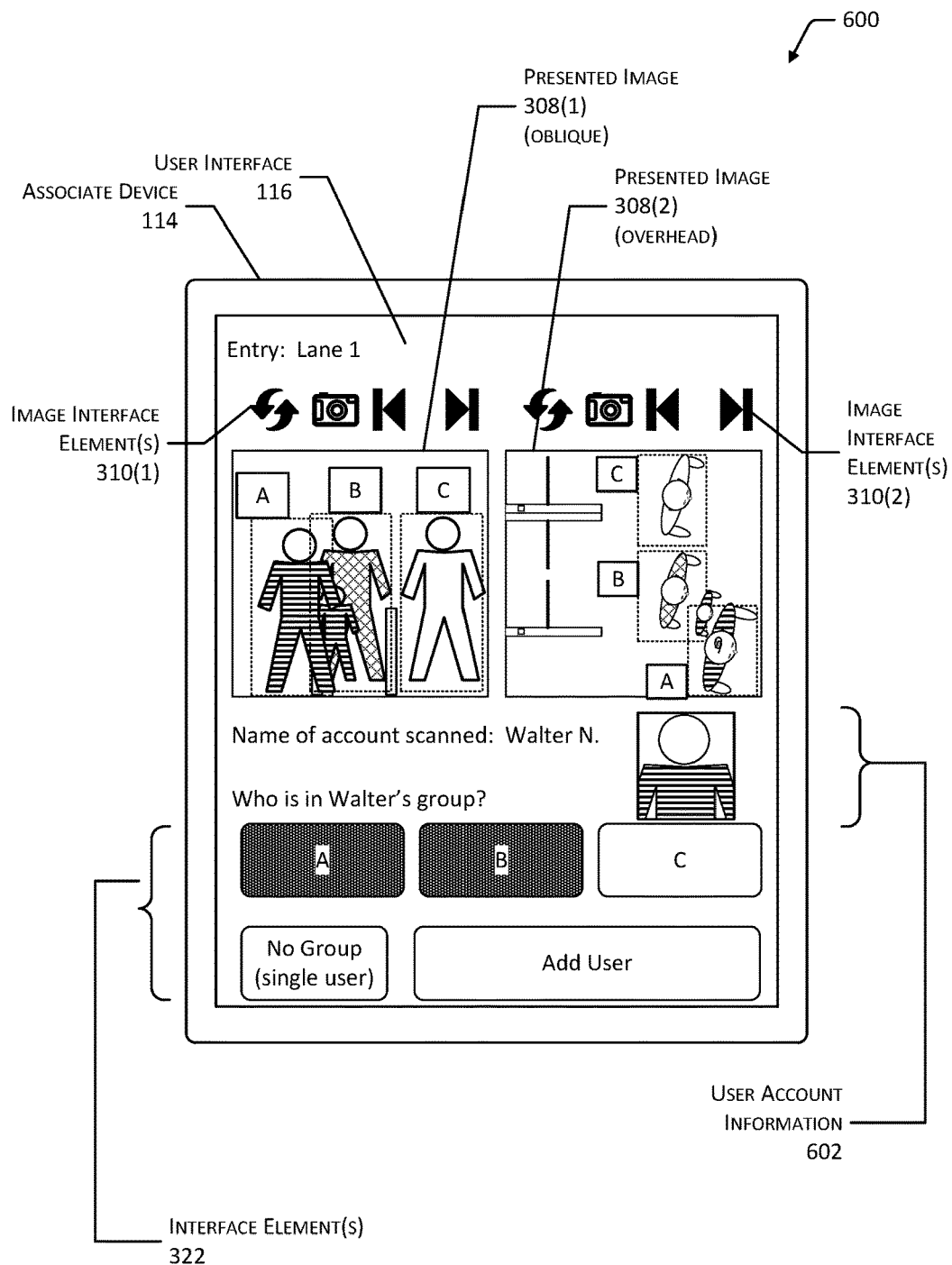
FIG. 6 depicts an illustration of a user interface to acquire input used to determine group data about users entering the facility that also presents information about an identified user, according to some implementations.

FIG. 6 depicts an illustration 600 of the user interface 116 configured to acquire group data 134 about users 102 entering the facility, according to some implementations. The user interface 116 also presents information about an identified user 102, according to some implementations. The user interface 116 depicted here may be presented by the associate device 114 or on another computing device.

In this illustration, the query is for the associate 102 to determine who is in a group. Depicted are two presented images 308. The first presented image 308(1) depicts image data 128 obtained from a camera arranged at an oblique angle relative to the users 102, such that the faces of the users 102 are visible. The second presented image 308(2) depicts image data 128 obtained from an overhead camera.

As described above, image interface elements 310 may be used to change the presentation of the presented images 308. Also presented are the various interface elements 322 allowing the associate 112 to provide input indicative of the determination by the associate 112 as to who is in a group. Depicted in this figure is user account information 602. For example, the user account information 602 may comprise a first name, surname, user name, registration picture, picture chain from a previous visit to the facility, and so forth, for a particular user 102. The user account information 602 may be based at least in part on the entry credential data 122 that was presented by the user 102 at the gate 106.

In some implementations, the image gallery section 304 (not shown here) may also be presented. For example, activation of an image interface element 310 may result in presentation of the image gallery section 304.

Figure 7:
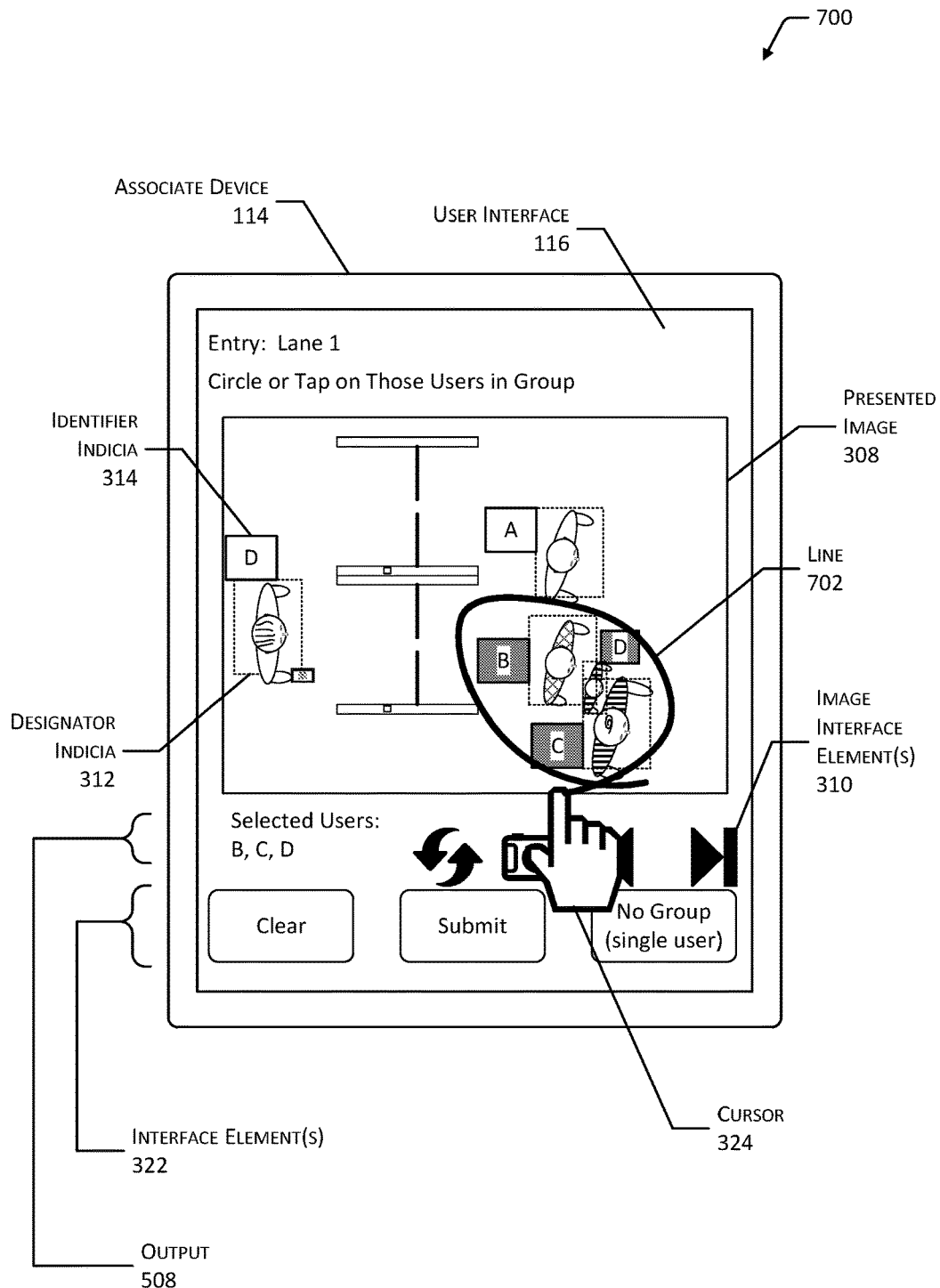
FIG. 7 depicts an illustration of a user interface to acquire input used to determine group data about users entering the facility by drawing on an image of users, according to some implementations.

FIG. 7 depicts an illustration 700 of the user interface 116 configured to acquire input used to determine group data 134 about users 102 entering the facility by drawing on an image of users 102, according to some implementations. The user interface 116 depicted here may be presented by the associate device 114 or on another computing device.

As depicted here, the associate device 114 may include a touch sensitive display. The user interface 116 may display the presented image 308. The associate 112 may use their finger, stylus, or other implement (represented here by the cursor 324) to draw a line 702 around the users 102 depicted in the presented image 308 that are deemed by the associate 112 to be members a single group. The resulting associate input data 132 indicative of this grouping may then be provided to the facility management system 118. In another implementation, the associate 112 may tap on a particular portion of the presented image 308, such as a particular identifier indicia 314 or designator indicia 312 to select or deselect a user 102 from a group.

In some implementations, the image gallery section 304 (not shown here) may also be presented. For example, activation of an image interface element 310 may result in presentation of the image gallery section 304.

Figure 8:
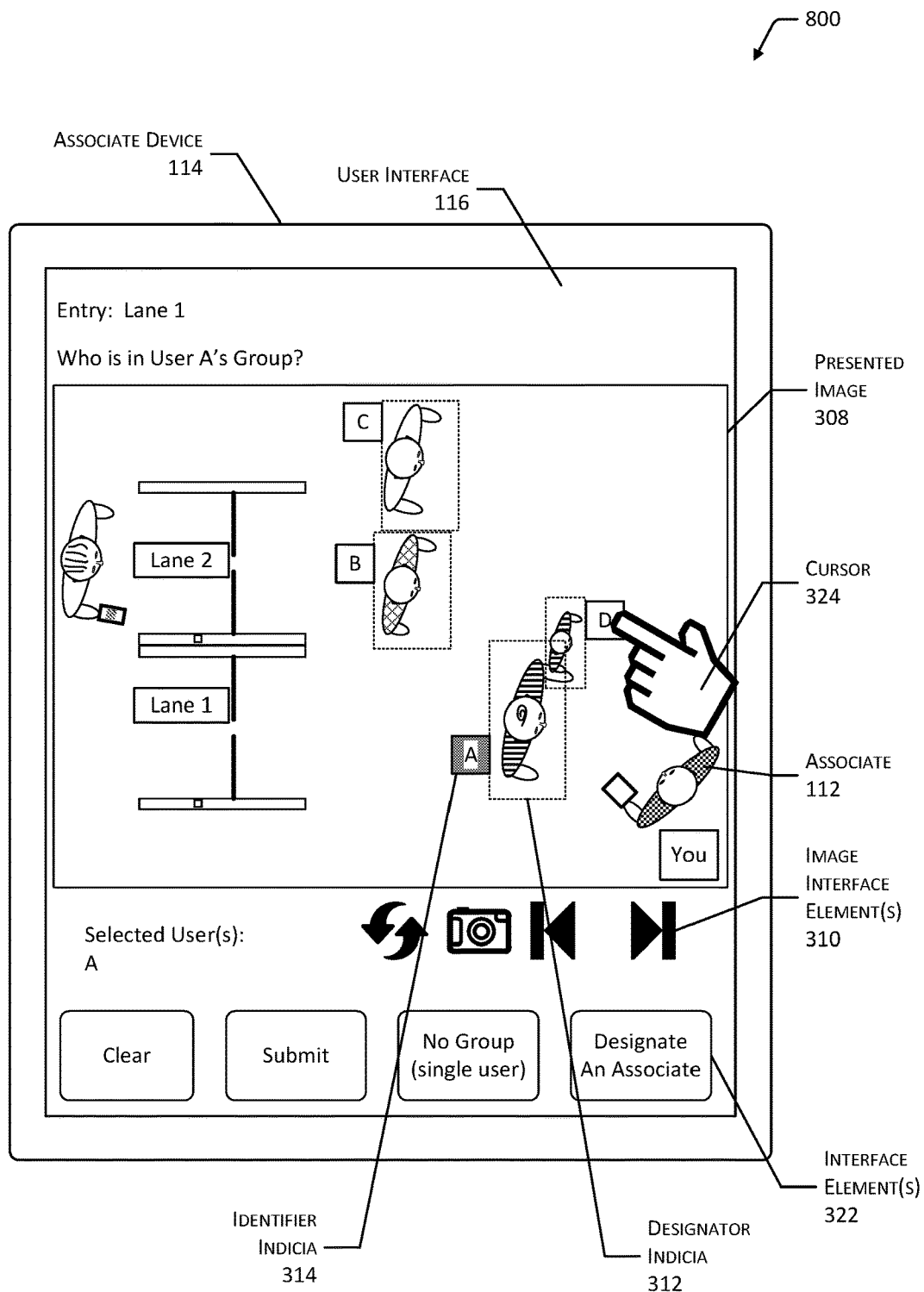
FIG. 8 depicts an illustration of a user interface to acquire input used to determine group data about users entering the facility that also includes an image of the associate, according to some implementations.

FIG. 8 depicts an illustration 800 of the user interface 116 configured to acquire input used to determine group data 134 about users 102 entering the facility that also includes an image of the associate 112, according to some implementations. The user interface 116 depicted here may be presented by the associate device 114 or on another computing device.

In this illustration, the associate 112 may select the members of a group directly within the presented image 308. For example, the associate 112 may tap or circle the identifier indicia 314 to add or remove the associated user 102 to the group.

As depicted here, the presented image 308 may include the associate 112. Inclusion of the associate 112 in the presented image 308 may provide cues that assist the associate 112 in answering a query. In some implementations, the apparent orientation of the presented image 308 and the user interface 116 may vary. For example, the presented image 308 may always be presented with north at the top of the display, such as depicted here. In another example, the presented image 308 may be oriented relative to a direction the associate 112 is facing. Identification data indicative of identification of the associate 112 may be accessed and used to cause display of one or more of an identifier indicia or a designator indicia indicative of the associate 112. For example, the name of the associate 112 may be retrieved and presented as an overlay in the presented image 308.

As described above, the user interface 116 may include other elements such as the image interface elements 310, interface elements 322, and so forth. In some implementations, the image gallery section 304 (not shown here) may also be presented. For example, activation of an image interface element 310 may result in presentation of the image gallery section 304.

Figure 9:
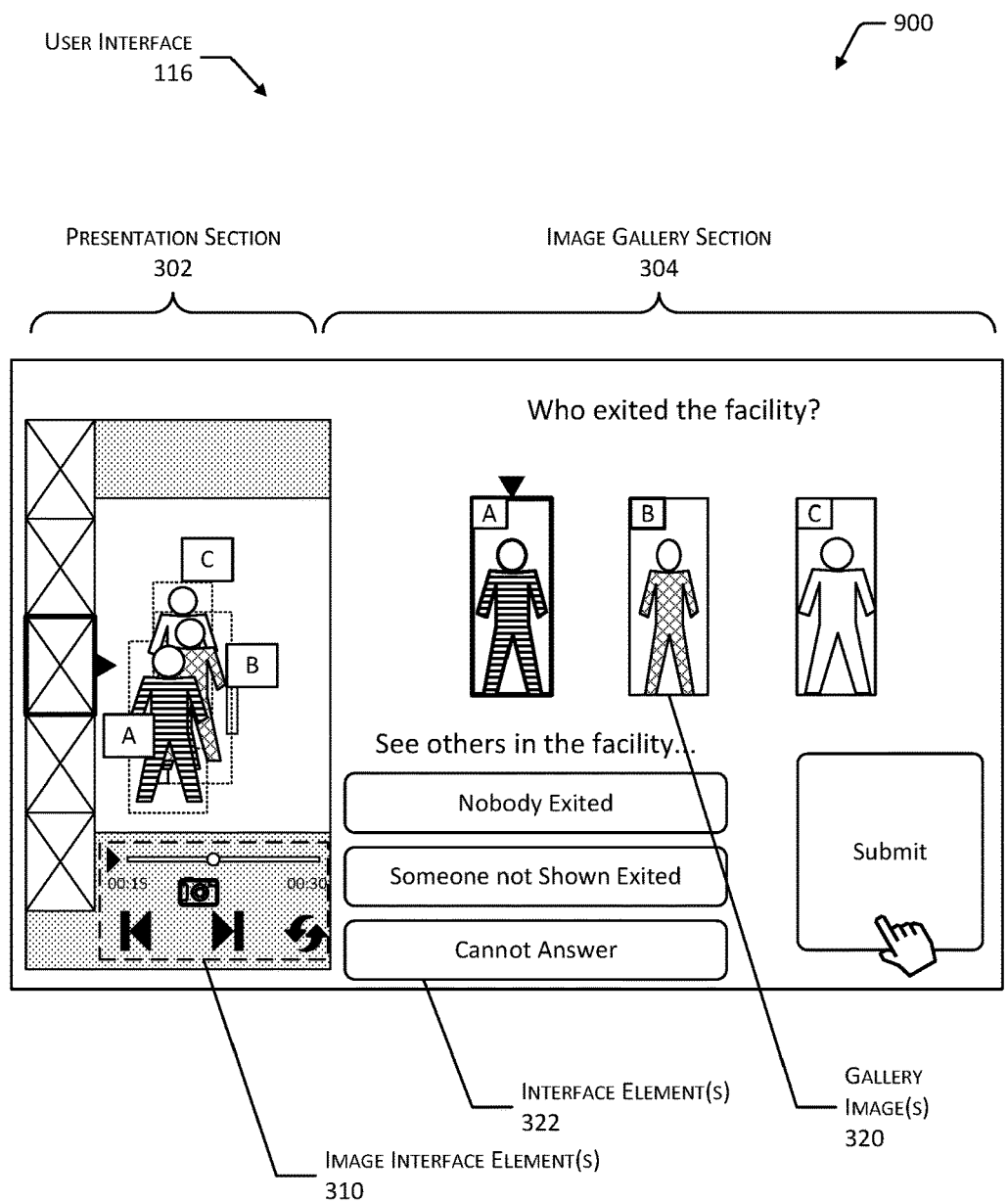
FIG. 9 depicts an illustration of a user interface to acquire input used to determine who has exited the facility, according to some implementations.

FIG. 9 depicts an illustration 900 of the user interface 116 configured to acquire input used to determine who of the users 102 has exited the facility, according to some implementations.

As users 102 exit the facility, the associate 112 may be queried to help determine who has left. In this illustration 900, image data 128 obtained by image sensors 108(2) covering the exit lanes 206 are displayed within the presentation section 302. The image gallery section 304 may present gallery images 320. For example, the gallery images 320 may comprise images obtained upon entry to the facility. By utilizing the interface elements 322, the associate 112 may provide associate input data 132 to the facility management system 118 for further processing.

Information in the image gallery section 304 may be presented based on information available to the facility management system 118. For example, gallery images 320 of users 102 who are believed to still be within the facility may be presented within the image gallery section 304. Continuing the example, gallery images 320 of users 102 who have already been determined to have left the facility and not re-entered may be omitted from the image gallery section 304.

As described above, in some implementations, the gallery images 320 selected for presentation within the image gallery section 304, the order of presentation, and so forth, may be determined based at least in part on information maintained by the facility management system 118. For example, the gallery images 320 may omit users 102 who are currently being tracked at a different location within the facility. In another example, gallery images 320 associated with the exit may be for those users 102 identified as being proximate to the exit lanes 206 at a particular time.

In one implementation, the exit lanes 206 may be configured to allow egress of the user 102 without further presentation of the user device 110. For example, the gate 106 in the exit lane 206 may open upon the approach of the user 102.

In another implementation, the gate 106 in the exit lane 206 may be configured to remain closed for a brief period of time and then open to allow the user 102 to pass. This brief period of time when the exit lane 206 is closed may allow for the acquisition of image data 128 that may be used to determine what users 102 have left the facility.

The facility management system 118 may receive lane data 124 indicative of passage of a user 102 at an exit lane 206 at a particular time. Tracking data may be accessed that is indicative of presence of the user 102 at the exit lane 206 at the particular time. For example, the tracking data may indicate that the location of the user 102 at the time immediately prior to the particular time was within a threshold distance of the exit lane 206 that generated the lane data 124. The facility management system 118 may then generate exit data indicative of the user 102 who is associated with the identifier as having left the facility. Based on this exit data, the identifier is designated as no longer being present in the facility.

Illustrative Systems

Figure 10:
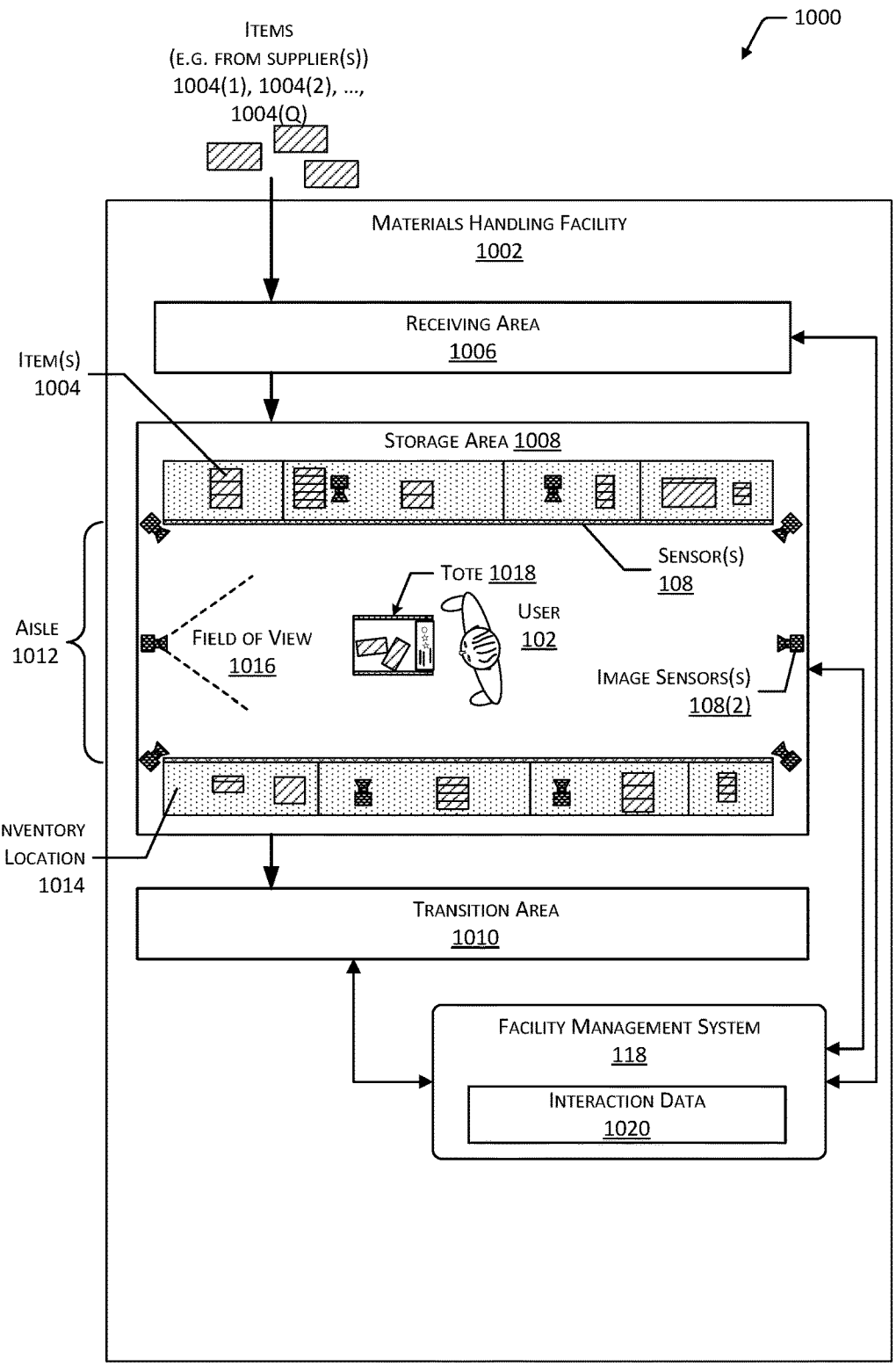
FIG. 10 is a block diagram illustrating a materials handling facility (facility) using the system to gather data about user entry, according to some implementations.

FIG. 10 is a block diagram 1000 illustrating a materials handling facility (facility) 1002 using the system 100, according to some implementations. A facility 1002 comprises one or more physical structures or areas within which one or more items 1004(1), 1004(2), . . . , 1004(Q) may be held. As used in this disclosure, letters in parenthesis such as "(Q)" indicate an integer value greater than or equal to zero. The items 1004 may comprise physical goods, such as books, pharmaceuticals, repair parts, electronic gear, and so forth.

The facility 1002 may include one or more areas designated for different functions with regard to inventory handling. In this illustration, the facility 1002 includes a receiving area 1006, a storage area 1008, and a transition area 1010.

The receiving area 1006 may be configured to accept items 1004, such as from suppliers, for intake into the facility 1002. For example, the receiving area 1006 may include a loading dock at which trucks or other freight conveyances unload the items 1004. In some implementations, the items 1004 may be processed, such as at the receiving area 1006, to generate at least a portion of item data. The item data may comprise information about a particular item 1004, such as size, shape, weight, color, stock keeping unit (SKU), and so forth. For example, an item 1004 may be imaged or otherwise scanned to develop reference images or representations of the item 1004 at the receiving area 1006.

The storage area 1008 is configured to store the items 1004. The storage area 1008 may be arranged in various physical configurations. In one implementation, the storage area 1008 may include one or more aisles 1012. The aisle 1012 may be configured with, or defined by, inventory locations 1014 on one or both sides of the aisle 1012. The inventory locations 1014 may include one or more of a hook, a shelf, a rack, a case, a cabinet, a bin, a floor location, or other suitable storage mechanisms for holding, supporting, or storing the items 1004. For example, the inventory locations 1014 may comprise racks with hooks or shelves with lanes designated therein. The inventory locations 1014 may be affixed to the floor or another portion of the structure of the facility 1002. The inventory locations 1014 may also be movable such that the arrangements of aisles 1012 may be reconfigurable. In some implementations, the inventory locations 1014 may be configured to move independently of an outside operator. For example, the inventory locations 1014 may comprise a rack with a power source and a motor, operable by a computing device to allow the rack to move from one location within the facility 1002 to another.

One or more users 102(1), 102(2), . . . , 102(U) and totes 1018(1), 1018(2), . . . , 1018(T) or other material handling apparatuses may move within the facility 1002. For example, the user 102 may move about within the facility 1002 to pick or place the items 1004 in various inventory locations 1014, placing them on the tote 1018 for ease of transport. The tote 1018 is configured to carry or otherwise transport one or more items 1004. For example, the tote 1018 may include a basket, cart, bag, bin, and so forth. In other implementations, other material handling apparatuses such as robots, forklifts, cranes, aerial drones, and so forth, may move about the facility 1002 picking, placing, or otherwise moving the items 1004. For example, a robot may pick an item 1004 from a first inventory location 1014(1) and move the item 1004 to a second inventory location 1014(2).

One or more sensors 108 may be configured to acquire information in the facility 1002. The sensors 108 may include, but are not limited to, barcode sensors 108(1) image sensors 108(2), and so forth. The sensors 108 may be stationary or mobile, relative to the facility 1002. The facility 1002 may include image sensors 108(2) to obtain images of the user 102 or other objects in the facility 1002. For example, stationary image sensors 108(2) may be mounted to walls, ceilings, furniture, while mobile image sensors 108(2) on the associate device 114 may be used. The sensors 108 may exhibit a field of view (FOV) 1016. For example, the image sensors 108(2) have a FOV 1016 within which they acquire images. The sensors 108 are discussed in more detail below with regard to FIG. 11. In another example, the inventory locations 1014 may contain weight sensors 108(8) to acquire weight data of items 1004 stowed therein, image sensors 108(2) to acquire images of picking or placement of items 1004, and so forth.

While the storage area 1008 is depicted as having one or more aisles 1012, inventory locations 1014 storing the items 1004, sensors 108, and so forth, it is understood that the receiving area 1006, the transition area 1010, or other areas of the facility 1002 may be similarly equipped. Furthermore, the arrangement of the various areas within the facility 1002 is depicted functionally rather than schematically. For example, in some implementations, multiple different receiving areas 1004, storage areas 1006, and transition areas 1008 may be interspersed rather than segregated in the facility 1002.

The facility 1002 may include, or be coupled to, the facility management system 118. The facility management system 118 is configured to interact with one or more of the users 102 or devices such as sensors 108, robots, material handling equipment, computing devices, and so forth, in one or more of the receiving area 1006, the storage area 1008, or the transition area 1010.

The facility management system 118 or other systems may use the sensor data to track the location of objects within the facility 1002, movement of the objects, or provide other functionality. The sensor data may include but is not limited to lane data 124, the image data 128, and so forth. Objects may include, but are not limited to, items 1004, users 102, totes 1018, and so forth. For example, a series of images acquired by the image sensor 108(2) may indicate removal by the user 102 of an item 1004 from a particular location on the inventory location 1014 and placement of the item 1004 on or at least partially within the tote 1018.

The facility 1002 may be configured to receive different kinds of items 1004 from various suppliers and to store them until a customer orders or retrieves one or more of the items 1004. A general flow of items 1004 through the facility 1002 is indicated by the arrows of FIG. 10. Specifically, as illustrated in this example, items 1004 may be received from one or more suppliers, such as manufacturers, distributors, wholesalers, and so forth, at the receiving area 1006. In various implementations, the items 1004 may include merchandise, commodities, perishables, or any suitable type of item 1004, depending on the nature of the enterprise that operates the facility 1002.

Upon being received from a supplier at the receiving area 1006, the items 1004 may be prepared for storage in the storage area 1008. For example, in some implementations, items 1004 may be unpacked or otherwise rearranged. The facility management system 118 may include one or more software applications executing on a computer system to provide inventory management functions. These inventory management functions may include maintaining information indicative of the type, quantity, condition, cost, location, weight, or any other suitable parameters with respect to the items 1004. The items 1004 may be stocked, managed, or dispensed in terms of countable units, individual units, or multiple units, such as packages, cartons, crates, pallets, or other suitable aggregations. Alternatively, some items 1004, such as bulk products, commodities, and so forth, may be stored in continuous or arbitrarily divisible amounts that may not be inherently organized into countable units. Such items 1004 may be managed in terms of a measurable quantity such as units of length, area, volume, weight, time, duration, or other dimensional properties characterized by units of measurement. Generally speaking, a quantity of an item 1004 may refer to either a countable number of individual or aggregate units of an item 1004 or a measurable amount of an item 1004, as appropriate.

After arriving through the receiving area 1006, items 1004 may be stored within the storage area 1008. In some implementations, like items 1004 may be stored or displayed together in the inventory locations 1014 such as in bins, on hooks, on shelves, and so forth. In such an implementation, all items 1004 of a given kind are stored in one inventory location 1014. In other implementations, like items 1004 may be stored in different inventory locations 1014. For example, to optimize retrieval of certain items 1004 having frequent turnover within a large physical facility 1002, those items 1004 may be stored in several different inventory locations 1014 to reduce congestion that might occur at a single inventory location 1014.

When a customer order specifying one or more items 1004 is received, or as a user 102 progresses through the facility 1002, the corresponding items 1004 may be selected or "picked" from the inventory locations 1014 containing those items 1004. In various implementations, item picking may range from manual to completely automated picking. For example, in one implementation, a user 102 may have a list of items 1004 they desire and may progress through the facility 1002 picking items 1004 from inventory locations 1014 within the storage area 1008 and placing those items 1004 into a tote 1018. In other implementations, employees of the facility 1002 may pick items 1004 using written or electronic pick lists derived from customer orders. These picked items 1004 may be placed into the tote 1018 as the employee progresses through the facility 1002.

After items 1004 have been picked, the items 1004 may be processed at a transition area 1010. The transition area 1010 may be any designated area within the facility 1002 where items 1004 are transitioned from one location to another or from one entity to another. For example, the transition area 1010 may be a packing station within the facility 1002. When the item 1004 arrives at the transition area 1010, the item 1004 may be transitioned from the storage area 1008 to the packing station. Information about the transition may be maintained by the facility management system 118.

In another example, if the items 1004 are departing the facility 1002, a list of the items 1004 may be obtained and used by the facility management system 118 to transition responsibility for, or custody of, the items 1004 from the facility 1002 to another entity. For example, a carrier may accept the items 1004 for transport with that carrier accepting responsibility for the items 1004 indicated in the list. In another example, a user 102 may purchase or rent the items 1004 and remove the items 1004 from the facility 1002. During use of the facility 1002, the user 102 may move about the facility 1002 to perform various tasks, such as picking or placing the items 1004 in the inventory locations 1014.

The facility management system 118 may generate interaction data 1020. The interaction data 1020 provides information about an interaction between the user 102 and an item 1004, such as a pick of an item 1004 from the inventory location 1014, a place of an item 1004 to the inventory location 1014, a touch made to an item 1004 at the inventory location 1014, a gesture associated with an item 1004 at the inventory location 1014, and so forth. The interaction data 1020 may include one or more of the type of interaction, interaction location identifier indicative of where at the inventory location 1014 the interaction took place, item identifier, quantity change to the item 1004, user identifier, and so forth. The interaction data 1020 may then be used to further update the item data. For example, the quantity of items 1004 on hand at a particular inventory location may be changed based on an interaction that picks or places one or more items 1004 at the inventory location 1014.

The facility management system 118 may combine or otherwise utilize different types of data from different types of sensors 108. For example, weight data obtained from weight sensors 108(8) at the inventory location 1014 may be used instead of, or in conjunction with image data 128 to determine the interaction data 1020.

Figure 11:
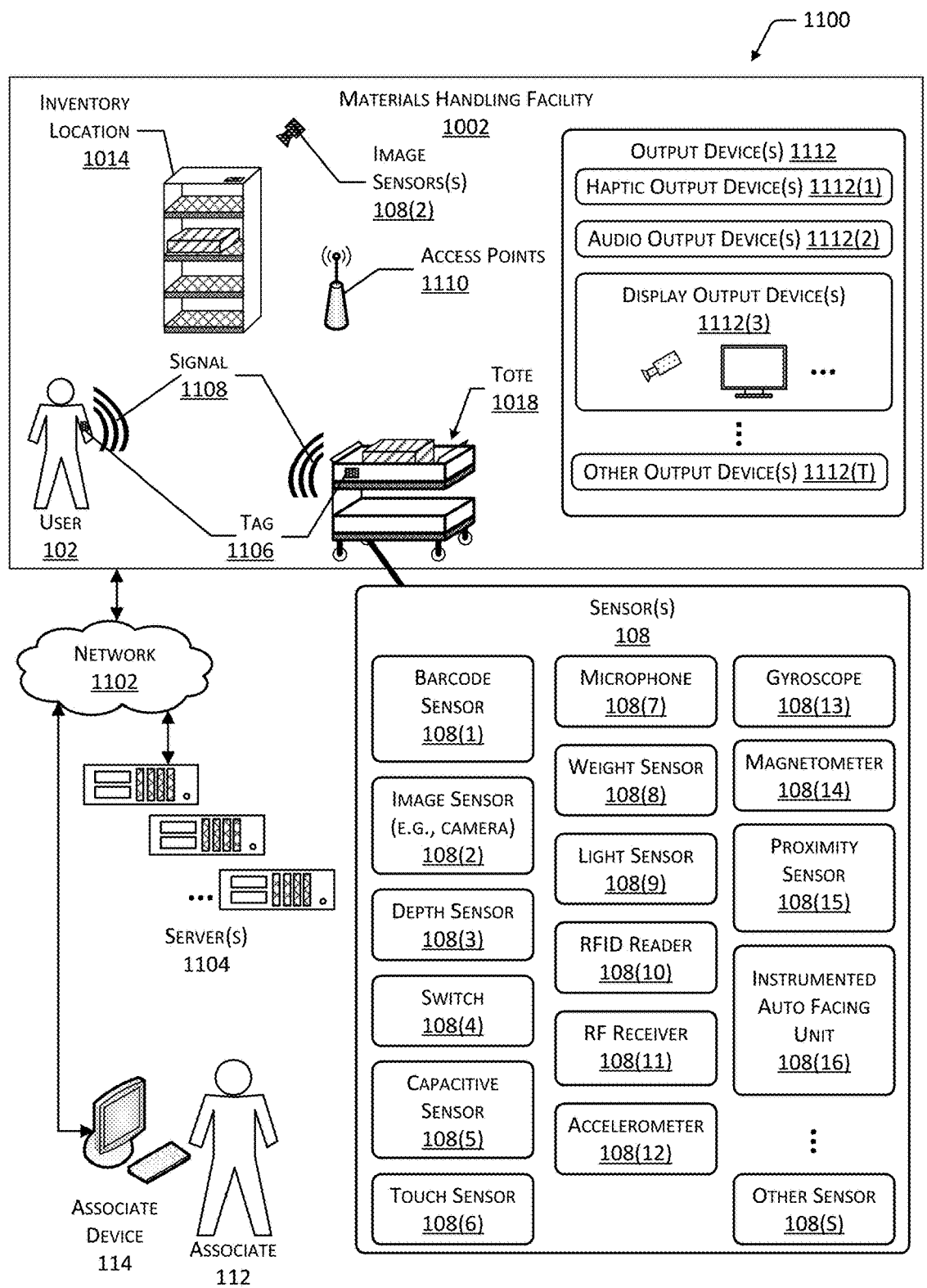
FIG. 11 is a block diagram illustrating additional details of the facility and sensors, according to some implementations.

FIG. 11 is a block diagram 1100 illustrating additional details of the facility 1002, according to some implementations. The facility 1002 may be connected to one or more networks 1102, which in turn connect to one or more servers 1104. The network 1102 may include private networks such as an institutional or personal intranet, public networks such as the Internet, or a combination thereof. The network 1102 may utilize wired technologies (e.g., wires, fiber optic cables, and so forth), wireless technologies (e.g., radio frequency, infrared, acoustic, optical, and so forth), or other connection technologies. The network 1102 is representative of any type of communication network, including one or more of data networks or voice networks. The network 1102 may be implemented using wired infrastructure (e.g., copper cable, fiber optic cable, and so forth), a wireless infrastructure (e.g., cellular, microwave, satellite, and so forth), or other connection technologies.

The servers 1104 may be configured to execute one or more modules or software applications associated with the facility management system 118 or other systems. While the servers 1104 are illustrated as being in a location outside of the facility 1002, in other implementations, at least a portion of the servers 1104 may be located at the facility 1002. The servers 1104 are discussed in more detail below with regard to FIG. 12.

The users 102, the totes 1018, or other objects in the facility 1002 may be equipped with one or more tags 1106. The tags 1106 may be configured to emit a signal 1108. In one implementation, the tag 1106 may be a radio frequency identification (RFID) tag 1106 configured to emit a RF signal 1108 upon activation by an external signal. For example, the external signal may comprise a radio frequency signal or a magnetic field configured to energize or activate the RFID tag 1106. In another implementation, the tag 1106 may comprise a transmitter and a power source configured to power the transmitter. For example, the tag 1106 may comprise a Bluetooth® Low Energy (BLE) transmitter and battery. In other implementations, the tag 1106 may use other techniques to indicate presence of the tag 1106. For example, an acoustic tag 1106 may be configured to generate an ultrasonic signal 1108, which is detected by corresponding acoustic receivers. In yet another implementation, the tag 1106 may be configured to emit an optical signal 1108.

The facility management system 118 may be configured to use the tags 1106 for one or more of identification of the object, determining a location of the object, and so forth. For example, the users 102 may wear tags 1106, the totes 1018 may have tags 1106 affixed, and so forth, which may be read and, based at least in part on signal strength, used to determine identity and location.

Generally, the facility management system 118 or other systems associated with the facility 1002 may include any number and combination of input components, output components, and servers 1104.

The one or more sensors 108 may be arranged at one or more locations within the facility 1002. For example, the sensors 108 may be mounted on or within a floor, wall, at a ceiling, at an inventory location 1014, on a tote 1018, may be carried or worn by a user 102, and so forth.

The sensors 108 may include one or more barcode sensors 108(1). The barcode sensors 108(1) may be configured to read an optical machine-readable code. The barcode sensors 108(1) may comprise a camera or other image sensor, laser scanner, photodetector array, and so forth. For example, the barcode sensor 108(1) may comprise the LSR116 or LSR118 unit produced by Access Limited of Reading, United Kingdom.

The sensors 108 may include one or more image sensors 108(2). The one or more image sensors 108(2) may include cameras configured to acquire images of a scene. The image sensors 108(2) are configured to detect light in one or more wavelengths including, but not limited to, terahertz, infrared, visible, ultraviolet, and so forth. The image sensors 108(2) may comprise charge coupled devices (CCD), complementary metal oxide semiconductor (CMOS) devices, microbolometers, and so forth. The facility management system 118 may use image data 128 acquired by the image sensors 108(2) during operation of the facility 1002. For example, the facility management system 118 may identify items 1004, users 102, totes 1018, and so forth, based at least in part on their appearance within the image data 128 acquired by the image sensors 108(1). The image sensors 108(2) may be mounted in various locations within the facility 1002. For example, image sensors 108(2) may be mounted overhead, on inventory locations 1014, may be worn or carried by users 102, may be affixed to totes 1018, and so forth.

One or more depth sensors 108(3) may also be included in the sensors 108. The depth sensors 108(3) may be used to acquire distance data, spatial or three-dimensional (3D) data, and so forth, about objects within a sensor FOV 1016. The depth sensors 108(3) may include optical time-of-flight systems, range cameras, lidar systems, sonar systems, radar systems, structured light systems, stereo vision systems, optical interferometry systems, and so forth.

The facility management system 118 may use the distance data acquired by the depth sensors 108(3) to determine a distance to an object, identify an object, determine a location of an object in 3D real space, and so forth. For example, the distance data or depth data provided by an optical time-of-flight sensor may indicate the presence of a user's 102 hand near a particular inventory location 1014.

One or more switches 108(4) may be used to acquire information. The switches 108(4) may be used to accept input from the user 102, detect contact with an inventory location 1014, and so forth. The switches 108(4) may comprise mechanical, capacitive, optical, or other mechanisms. The facility management system 118 may use data from the switches 108(4) to generate event data.

The sensors 108 may include capacitive sensors 108(5). Circuitry associated with the capacitive sensor 108(5) generates capacitance data. The capacitive sensor 108(5) may comprise one or more conductive elements and a capacitive sensor module that includes electronics to determine the capacitance of a conductive element. The capacitive sensors 108(5) may be configured to utilize a far-field capacitance effect. The far-field capacitance effect may be determined by measuring the self-capacitance of the conductive elements, rather than a mutual capacitance. In one implementation, a known charge may be provided to the conductive element, and the resultant voltage may be measured between the conductive element and the ground. A shield comprising an electrical conductor may be arranged along one or more sides of the conductive element. For example, the shield may be separated from the conductive element by an electrical insulator. During operation, the shield may be driven to the same (or a substantially similar) electrical potential as that provided to the conductive element. As a result of this, a voltage difference that is below a threshold voltage results between the shield and the conductive element. In some implementations, the voltage difference may be zero. The shield in this configuration directs the electric field generally away from the shield. This directionality may be used to prevent erroneous readings for objects on the back side of the conductive element, which may occur in an unshielded configuration. The directionality may also be used to provide a desired sensor FOV 1016. In some implementations, a ground plane may be arranged behind the shield, opposite the conductive element. The ground plane may be separated from the shield by an electrical insulator. The ground plane may be connected to an earth ground in some implementations. Proximity of an object to the conductive element or contact by the object with the conductive element affects the charge on the conductive element, producing a change in the resultant voltage that may then be measured and used to determine a capacitance value.

The sensors 108 may include one or more touch sensors 108(6). The touch sensors 108(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The facility management system 118 may use data from the touch sensors 108(6) to receive information from the user 102. For example, the touch sensor 108(6) may be integrated with the tote 1018 to provide a touchscreen with which the user 102 may select from a menu one or more particular items 1004 for picking, enter a manual count of items 1004 at an inventory location 1014, and so forth. In some implementations, the touch sensors 108(6) may provide information indicative of a fingerprint of a person, such as the user 102. This information may be used to identify the person.

One or more microphones 108(7) may be configured to acquire information indicative of sound present in the environment. In some implementations, arrays of microphones 108(7) may be used. These arrays may implement beamforming techniques to provide for directionality of gain. The facility management system 118 may use the one or more microphones 108(7) to acquire information from acoustic tags 1106, accept voice input from the users 102, determine ambient noise level, determine location of the user 102 within the facility 1002, and so forth.

The sensors 108 may include one or more weight sensors 108(8) that are configured to measure the weight of a load, such as the item 1004, the tote 1018, or other objects. The weight sensors 108(8) may be configured to measure the weight of the load at one or more of the inventory locations 1014, the tote 1018, on the floor of the facility 1002, and so forth. For example, the inventory location 1014 may include a plurality of hooks, lanes, or platforms, with one or more weight sensors 108(8) to provide weight data about an individual hook, lane, or platform. The weight sensors 108(8) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 108(8) may operate as transducers that generate one or more signals based on an applied force, such as that of the load due to gravity. For example, the weight sensor 108(8) may comprise a load cell having a strain gauge and a structural member that deforms slightly when weight is applied. By measuring a change in the electrical characteristic of the strain gauge, such as capacitance or resistance, the weight may be determined. In another example, the weight sensor 108(8) may comprise a force sensing resistor (FSR). The FSR may comprise a resilient material that changes one or more electrical characteristics when compressed. For example, the electrical resistance of a particular portion of the FSR may decrease as the particular portion is compressed by an applied mechanical force. The facility management system 118 may use the data acquired by the weight sensors 108(8) to identify an object, determine a change in the quantity of objects, determine a location of an object, maintain shipping records, and so forth.

The sensors 108 may include one or more light sensors 108(9). The light sensors 108(9) may be configured to provide photodetector data indicative of one or more of color or intensity of light impinging thereupon. For example, the light sensor 108(9) may comprise a photodiode and associated circuitry configured to generate a signal or data indicative of an incident flux of photons. The light sensors 108(9) may be sensitive to one or more of infrared light, visible light, or ultraviolet light. For example, the light sensors 108(9) may be sensitive to infrared light, and infrared light sources such as light emitting diodes (LEDs) may provide illumination. The light sensors 108(9) may include photodiodes, photoresistors, photovoltaic cells, quantum dot photoconductors, bolometers, pyroelectric infrared detectors, and so forth. For example, the light sensor 108(9) may use germanium photodiodes to detect infrared light.

One or more radio frequency identification (RFID) readers 108(10), near field communication (NFC) systems, and so forth, may be included as sensors 108. For example, the RFID readers 108(10) may be configured to read the RF tags 1106. Information acquired by the RFID reader 108(10) may be used by the facility management system 118 to identify an object associated with the RF tag 1106 such as the item 1004, the user 102, the tote 1018, and so forth. For example, based on information from the RFID readers 108(10) detecting the RF tag 1106 at different times and RFID readers 108(10) having different locations in the facility 1002, a velocity of the RF tag 1106 may be determined. In another example, the RFID readers 108(10) may receive the entry credential data 122 from the user device 110.

One or more RF receivers 108(11) may also be included as sensors 108. In some implementations, the RF receivers 108(11) may be part of transceiver assemblies. The RF receivers 108(11) may be configured to acquire RF signals 1108 associated with Wi-Fi®, Bluetooth®, ZigBee®, 4G, 3G, LTE, or other wireless data transmission technologies. The RF receivers 108(11) may provide information associated with data transmitted via radio frequencies, signal strength of RF signals 1108, and so forth. For example, information from the RF receivers 108(11) may be used by the facility management system 118 to determine a location of an RF source, such as a communication interface onboard the tote 1018. In another example, the RF receivers 108(11) may receive entry credential data 122 from the user device 110.

The sensors 108 may include one or more accelerometers 108(12), which may be worn or carried by the user 102, mounted to the tote 1018, included in the associate device 114, and so forth. The accelerometers 108(12) may provide information such as the direction and magnitude of an imposed acceleration. Data such as rate of acceleration, determination of changes in direction, speed, and so forth, may be determined using the accelerometers 108(12).

A gyroscope 108(13) may provide information indicative of rotation of an object affixed thereto. For example, the associate device 114 may be equipped with a gyroscope 108(13) to provide data indicative of orientation of the associate device 114.

A magnetometer 108(14) may be used to determine an orientation by measuring ambient magnetic fields, such as the terrestrial magnetic field. The magnetometer 108(14) may be worn or carried by the user 102, mounted to another device, and so forth. For example, the magnetometer 108 (14) mounted to the associate device 114 may act as a compass and provide information indicative of which direction the associate device 114 is oriented. In another example, a magnetometer 108(14) in the user device 110 may detect particular magnetic fields in the entry area 202. Information about these magnetic fields may then be used to determine that the user device 110 has passed through the entry area 202.

The sensors 108 may include proximity sensors 108(15) used to determine presence of an object, such as the user 102, the tote 1018, and so forth. The proximity sensors 108(15) may use optical, electrical, ultrasonic, electromagnetic, or other techniques to determine a presence of an object. In some implementations, the proximity sensors 108(15) may use an optical emitter and an optical detector to determine proximity. For example, an optical emitter may emit light, a portion of which may then be reflected by the object back to the optical detector to provide an indication that the object is proximate to the proximity sensor 108(15). In other implementations, the proximity sensors 108(15)

may comprise a capacitive proximity sensor 108(15) configured to provide an electrical field and determine a change in electrical capacitance due to presence or absence of an object within the electrical field.

The proximity sensors 108(15) may be configured to provide sensor data indicative of one or more of a presence or absence of an object, a distance to the object, or characteristics of the object. An optical proximity sensor 108(15) may use time-of-flight (ToF), structured light, interferometry, or other techniques to generate the distance data. For example, an optical time-of-flight sensor determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 108 such as an image sensor 108(2). Based on an apparent distance between the features of the structured light pattern, the distance to the object may be calculated. Other techniques may also be used to determine distance to the object. In another example, the color of the reflected light may be used to characterize the object, such as skin, clothing, tote 1018, and so forth.

The sensors 108 may also include an instrumented autofacing unit (IAFU) 108(16). The IAFU 108(16) may comprise a position sensor configured to provide data indicative of displacement of a pusher. As an item 1004 is removed from the IAFU 108(16), the pusher moves, such as under the influence of a spring, and pushes the remaining items 1004 in the IAFU 108(16) to the front of the inventory location 1014. By using data from the position sensor, and given item data such as a depth of an individual item 1004, a count may be determined, based on a change in position data. For example, if each item 1004 is 1 inch deep and the position data indicates a change of 11 inches, the quantity held by the IAFU 108(16) may have changed by 11 items 1004. This count information may be used to confirm or provide a cross check for a count obtained by other means, such as analysis of the weight data, the image data 128, and so forth.

The sensors 108 may include other sensors 108(S) as well. For example, the other sensors 108(S) may include light curtains, ultrasonic rangefinders, thermometers, barometric sensors, hygrometers, biometric sensors, and so forth. For example, the facility management system 118 may use information from biometric sensors such as fingerprint readers, hand readers, iris readers, and so forth, to identify the user 102, the associate 112, or other people in the facility 1002.

In one implementation, a light curtain may utilize a linear array of light emitters and a corresponding linear array of light detectors. For example, the light emitters may comprise a line of infrared LEDs or vertical cavity surface emitting lasers (VCSELs) that are arranged above and in front of the inventory location 1014, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the hand of the user 102 crossing this lightplane would prevent at least some of the light from light emitters from reaching a corresponding light detector. As a result, a position of the object along the linear array may be determined that is indicative of a touchpoint. This position may be expressed as touchpoint data, with the touchpoint being indicative of the intersection between the hand of the user 102 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 102 may be used to generate event data.

In some implementations, the image sensor 108(2) or other sensors 108(S) may include hardware processors, memory, and other elements configured to perform various functions. For example, the image sensors 108(2) may be configured to generate image data 128, send the image data 128 to another device such as the server 1104, and so forth.

The facility 1002 may include one or more access points 1110 configured to establish one or more wireless networks. The access points 1110 may use Wi-Fi®, NFC, Bluetooth®, or other technologies to establish wireless communications between a device and the network 1102. The wireless networks allow the devices to communicate with one or more of the sensors 108, the facility management system 118, the tag 1106, a communication device of the tote 1018, or other devices.

Output devices 1112 may also be provided in the facility 1002. The output devices 1112 are configured to generate signals, which may be perceived by the user 102 or detected by the sensors 108.

Haptic output devices 1112(1) are configured to provide a signal that results in a tactile sensation to the user 102. The haptic output devices 1112(1) may use one or more mechanisms such as electrical stimulation or mechanical displacement to provide the signal. For example, the haptic output devices 1112(1) may be configured to generate a modulated electrical signal, which produces an apparent tactile sensation in one or more fingers of the user 102. In another example, the haptic output devices 1112(1) may comprise piezoelectric or rotary motor devices configured to provide a vibration, which may be felt by the user 102.

One or more audio output devices 1112(2) may be configured to provide acoustic output. The acoustic output includes one or more of infrasonic sound, audible sound, or ultrasonic sound. The audio output devices 1112(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display output devices 1112(3) may be configured to provide output, which may be seen by the user 102 or detected by a light-sensitive sensor such as an image sensor 108(2) or a light sensor 108(9). In some implementations, the display output devices 1112(3) may be electronically controlled to produce output in one or more of infrared, visible, or ultraviolet light. The output may be monochrome or in color. The display output devices 1112(3) may be one or more of emissive, reflective, microelectromechanical, and so forth. An emissive display output device 1112(3), such as using LEDs, electroluminescent elements, quantum dots, and so forth, is configured to emit light during operation. In comparison, a reflective display output device 1112(3), such as using an electrophoretic or interferometric element, relies on ambient light to present an image. Backlights or front lights may be used to illuminate non-emissive display output devices 1112(3) to provide visibility of the output in conditions where the ambient light levels are low. In some implementations, the display output devices 1112(3) may comprise pre-printed tags, labels, and so forth.

Other output devices 1112(T) may also be present. For example, the other output devices 1112(T) may include scent/odor dispensers, document printers, 3D printers or fabrication equipment, and so forth.

One or more of the sensors 108, one or more of the output devices 1112, or both may be included in the user device 110, associate device 114, or other computing devices. The sensors 108 may be used as input devices on the user device 110, the associate device 114, or other computing devices. For example, a display output device 1112(3) such as an LED display may be combined with a touch sensor 108(6) to provide a touchscreen. The user interface 116 including image interface elements 310, interface elements 322, or other interface elements may be presented on the display output device 1112(3). When a person touches the touchscreen, a signal is generated by the touch sensor 108(6) and data is generated indicative of the position of the touch. The position of the touch is then associated with the position of the interface element 322 presented on the display output device 1112(3). For example, the touch sensor 108(6) may report a touch at coordinates (207, 195). Software executing on the computing device may associate the touch at coordinates (207, 195) with coordinates on the display output device 1112(3) of (657, 598). These coordinates on the display output device 1112(3) of (657, 598) may be determined to be within the boundary of an interface element 322 that looks like a button. Based on this determination, one or more computer-executable instructions assigned to the interface element 322 may be executed. For example, the instructions may result in generating data indicative of selection of the button.

Figure 12:
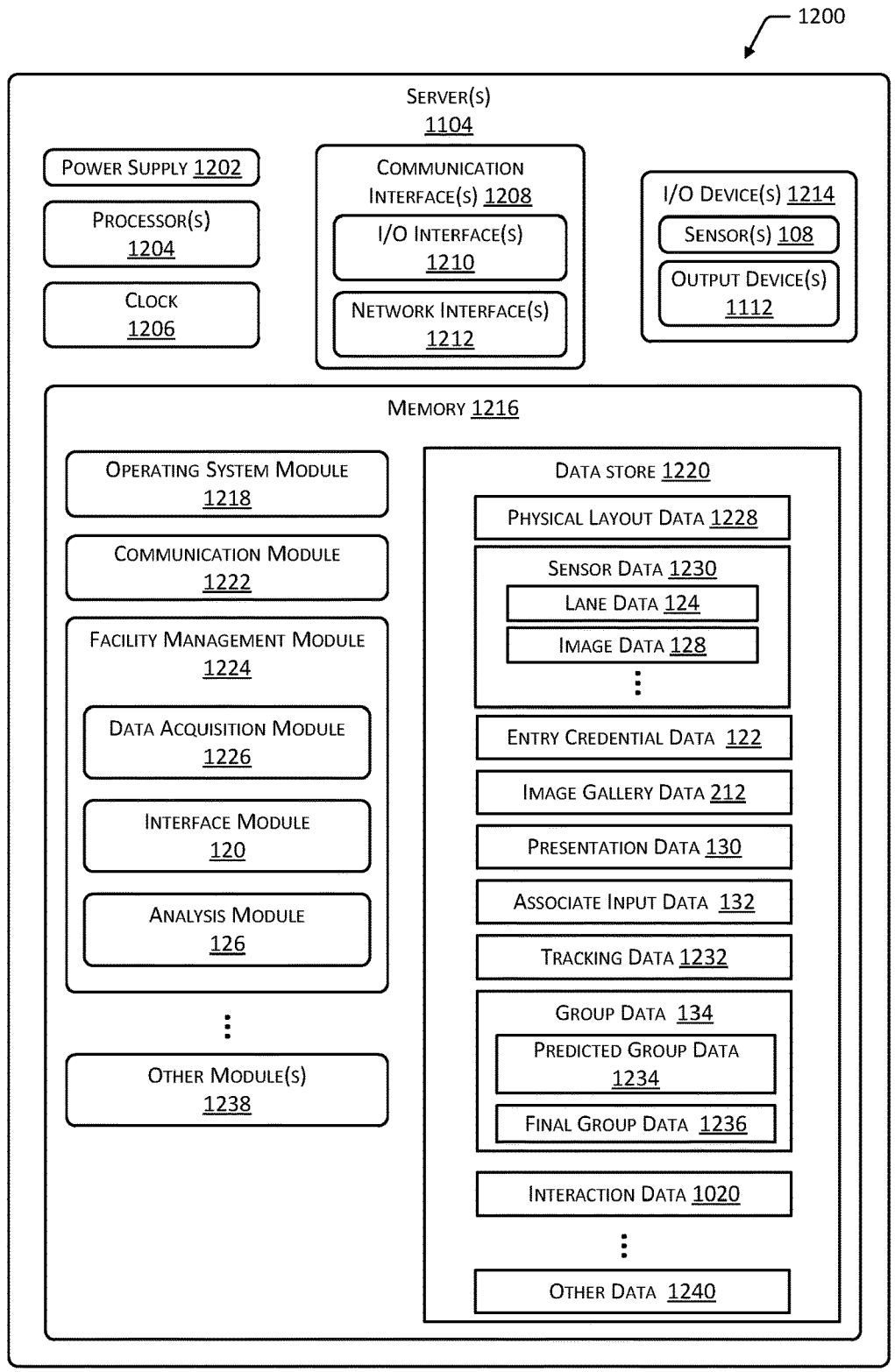
FIG. 12 is a block diagram of a server to support operation of the facility, according to some implementations.

FIG. 12 illustrates a block diagram 1200 of a server 1104 configured to support operation of the facility 1002, according to some implementations. The server 1104 may be physically present at the facility 1002, may be accessible by the network 1102, or a combination of both. The server 1104 does not require end-user knowledge of the physical location and configuration of the system that delivers the services. Common expressions associated with the server 1104 may include "on-demand computing", "software as a service (SaaS)", "platform computing", "network-accessible platform", "cloud services", "data centers", and so forth. Services provided by the server 1104 may be distributed across one or more physical or virtual devices.

One or more power supplies 1202 may be configured to provide electrical power suitable for operating the components of the server 1104. The one or more power supplies 1202 may comprise batteries, capacitors, fuel cells, photovoltaic cells, wireless power receivers, conductive couplings suitable for attachment to an external power source such as provided by an electric utility, and so forth. The server 1104 may include one or more hardware processors 1204 (processors) configured to execute one or more stored instructions. The processors 1204 may comprise one or more cores. One or more clocks 1206 may provide information indicative of date, time, ticks, and so forth. For example, the processor 1204 may use data from the clock 1206 to associate a particular interaction with a particular point in time.

The server 1104 may include one or more communication interfaces 1208 such as input/output (I/O) interfaces 1210, network interfaces 1212, and so forth. The communication interfaces 1208 enable the server 1104, or components thereof, to communicate with other devices or components. The communication interfaces 1208 may include one or more I/O interfaces 1210. The I/O interfaces 1210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1210 may couple to one or more I/O devices 1214. The I/O devices 1214 may include input devices such as one or more of a sensor 108, keyboard, mouse, touch sensor 108(6), scanner, and so forth. The I/O devices 1214 may also include output devices 1112 such as one or more of a display output device 1112(3), printer, audio speakers, and so forth. In some embodiments, the I/O devices 1214 may be physically incorporated with the server 1104 or may be externally placed.

The network interfaces 1212 may be configured to provide communications between the server 1104 and other devices, such as the totes 1018, routers, access points 1110, and so forth. The network interfaces 1212 may include devices configured to couple to personal area networks (PANs), local area networks (LANs), wireless local area networks (WLANS), wide area networks (WANs), and so forth. For example, the network interfaces 1212 may include devices compatible with Ethernet, Wi-Fi®, Bluetooth®, ZigBee®, and so forth.

The server 1104 may also include one or more busses or other internal communications hardware or software that allow for the transfer of data between the various modules and components of the server 1104.

As shown in FIG. 12, the server 1104 includes one or more memories 1216. The memory 1216 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1216 provides storage of computer-readable instructions, data structures, program modules, and other data for the operation of the server 1104. A few example functional modules are shown stored in the memory 1216, although the same functionality may alternatively be implemented in hardware, firmware, or as a system on a chip (SoC).

The memory 1216 may include at least one operating system (OS) module 1218. The OS module 1218 is configured to manage hardware resource devices such as the I/O interfaces 1210, the I/O devices 1214, the communication interfaces 1208, and provide various services to applications or modules executing on the processors 1204. The OS module 1218 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 1216 may be a data store 1220 and one or more of the following modules. These modules may be executed as foreground applications, background tasks, daemons, and so forth. The data store 1220 may use a flat file, database, linked list, tree, executable code, script, or other data structure to store information. In some implementations, the data store 1220 or a portion of the data store 1220 may be distributed across one or more other devices including the servers 1104, network attached storage devices, and so forth.

A communication module 1222 may be configured to establish communications with one or more of the associate devices 114, the totes 1018, the sensors 108, other servers

1104, or other devices. The communications may be authenticated, encrypted, and so forth.

The memory 1216 may store a facility management module 1224. The facility management module 1224 is configured to provide the inventory functions as described herein with regard to the facility management system 118. For example, the facility management module 1224 may track users 102 within the facility 1002, maintain information about their grouping, track movement of items 1004 as they are picked or placed by the user 102, and so forth.

The facility management module 1224 may include one or more of a data acquisition module 1226, the interface module 120, the analysis module 126, and so forth. The data acquisition module 1226 may be configured to acquire and access information associated with operation of the facility 1002. For example, the data acquisition module 1226 may acquire sensor data 1230 such as the lane data 124 from the gate 106, the image data 128 from the image sensors 108(2), and so forth. The sensor data 1230 may be accessed by the other modules for use.

The interface module 120 may operate as described above to allow the facility management system 118 to interact with other devices. The data store 1220 may store at least a portion of the entry credential data 122, the presentation data 130, the associate input data 132, and so forth.

The analysis module 126 may be configured to use information such as one or more of the physical layout data 1228, item data, sensor data 1230, and so forth, to generate information such as tracking data 1232, event data, the interaction data 1020, and so forth.

The physical layout data 1228 may provide information indicative of where sensors 108 and inventory locations 1014 are in the facility 1002 with respect to one another, FOV 1016 of sensors 108 relative to the inventory location 1014, and so forth. For example, the physical layout data 1228 may comprise information representative of a map or floor plan of the facility 1002 with relative positions of inventory locations 1014, planogram data indicative of how items 1004 are to be arranged at the inventory locations 1014, and so forth.

The physical layout data 1228 may associate a particular inventory location ID with other information such as physical location data, sensor position data, sensor direction data, sensor identifiers, and so forth. The physical location data provides information about where in the facility 1002 objects are, such as the inventory location 1014, the sensors 108, and so forth. In some implementations, the physical location data may be relative to another object. For example, the physical location data may indicate that a particular weight sensor 108(8) or image sensor 108(2) is associated with a particular inventory location 1014.

The tracking data 1232 may comprise information indicative of a location with respect to the facility 1002 and a time of that location for a particular object. For example, the tracking data 1232 may comprise a time series of location data and timestamps for a particular user 102. The tracking data 1232 may be determined using the sensor data 1230. For example, the image data 128 may be processed by computer vision algorithms that perform image-based blob tracking, where the blob in the image is that of the user 102, tote 1018, or other object. The blob is a representation of an object being tracked in the image data, but need not be recognized as a particular thing. For example, the image-based blob tracking follows a cluster of pixels as they move about within an image, without resorting to object recognition to determine if that cluster of pixels is a user 102, tote, and so forth. In other implementations other image-based tracking may also be used. For example, the object may be recognized as a particular human face, and may be subsequently tracked as such. The image-based tracking accesses a plurality of images obtained from a plurality of cameras to determine a location within the facility of the user 102. Given the known location of a particular camera, known orientation of the camera, optical characteristics, or other information and the relative position of the object within the image data acquired from each camera, the location of the object may be determined.

The event data may comprise information indicative of a change deemed to be significant that is associated with an inventory location 1014 or portion thereof. For example, the event data may be indicative of a determination by a capacitive sensor 108(5) of proximity of an object, such as an item 1004 or user 102. In another example, the event data may comprise an indication that a weight change has exceeded a threshold value. In yet another example, the event data may indicate that motion between a plurality of images has been detected that exceeds a threshold value. The analysis module 126 may utilize one or more filter functions, comparison functions, and so forth, to determine the event data. For example, the event data may result from a determination that the capacitance data and weight data have each experienced changes that exceed respective threshold values. The analysis module 126 may utilize various rules or conditions to determine the occurrence of an event and subsequent generation of event data.

The analysis module 126 may also accept as input other sensor data 1230, such as input from a light sensor 108(9), accelerometer 108(12), RF receiver 108(11), and so forth. The analysis module 126 may process the sensor data 1230 using various techniques. For example, the image data 128 may be processed to generate information indicative of changes between images, object recognition data, determine the presence of a person, track and object, and so forth. For example, the generation of the designator indicia 312 may be performed at least in part by the analysis module 126 by processing at least a portion of the image data 128 with one or more computer vision algorithms to detect the presence of a person, or portion thereof such as the face of the user 102.

Processing of one or more of the image data 128 or portions thereof may be performed by implementing, at least in part, one or more of the following tools or techniques. In one implementation, processing of the image data 128 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 128. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 1230 or other data. For example, the ANN may be a trained using a supervised learning algorithm such that object identifiers are associated with images of particular objects within training images provided to the ANN. Once trained, the ANN may be provided with the sensor data 1230 and the item data to allow for a determination of similarity between two or more images.

The analysis module 126 may generate the interaction data 1020. The interaction data 1020 may include information indicative of a particular inventory location 1014 at which some activity has taken place, such as a pick or place of an item 1004. Location information for an interaction may indicate a particular inventory location, coordinates of the point or area at an inventory location 1014 that includes several hooks, and so forth. The interaction may comprise movement, presence, pick, place, and so forth, of an object or an item 1004. For example, a location associated with a pick may be determined by using tracking data 1232 to determine a particular user 102 is present at a particular inventory location 1014.

The analysis module 126 may be configured to generate group data 134. For example, the analysis module 126 may use computer vision techniques, ANNs, and so forth, to attempt to determine if two or more users 102 are members of a common group. As described above, in some implementations, the results of this automated process may be unavailable or may be associated with a confidence value that is below a threshold. For example, an automated determination of a group may be suggestive, but considered unreliable by itself.

The group data 134 may include or be based at least in part on one or more of predicted group data 1234 or final data 1236. The analysis module 126 may generate predictive group data 1234 without human intervention. The predicted group data 1234 may comprise the automated system's determined assessment as to the membership of a group. The predicted group data 1234 may be based at least in part on one or more of: determined physical distance in the facility 1002 between a first user 102(1) and a second user 102(2), determined resemblance between the first user 102(1) and the second user 102(2), sequential entry of the first user 102(1) and the second user 102(2) at the facility 1002, entry credential data 122 obtained from the first user 102(1) and the second user 102(2) during entry to the facility 1002, and so forth. For example, the analysis module 126 may determine metrics that are descriptive of the faces of two users 102. When the variance between those metrics is less than or equal to a threshold value, the two users 102 may be deemed to resemble one another. For example, siblings may resemble one another. In another implementation, resemblance may be based at least in part on the similarity of colors worn. For example, a group of users 102 that are in uniform and enter consecutively may be determined to be members of the group. In another example, the predicted group data 1234 may be generated by grouping users 102 who exhibit a relative distance from each other that is less than a threshold distance. In another example, the predicted group data 1234 may be generated by determining if two users 102 are in contact with one another, such as holding hands.

The final group data 1236 may comprise what the facility management system 118 had deemed to be definitive of indicative of a grouping between users 102. For example, where the predicted group data 1234 is above a threshold confidence value, the predicted group data 1234 may be used as the final data 1236. In another example, where the predicted group data 1234 is below the threshold confidence value, associate input data 132 may be obtained using user interfaces 116 described above. Based on this associate input data 132, final group data 1236 may be determined. For example, the final group data 1236 may comprise the information specified by the associate input data 132.

The facility management module 1224, and modules associated therewith, may access sensor data 1230, threshold data, and so forth. The threshold data may comprise one or more thresholds, ranges, percentages, and so forth, that may be used by the various modules in operation. For example, the analysis module 126 may access threshold data to determine if a confidence value of a determination of identification, grouping, and so forth, necessitates the use of the associate 112.

The facility management module 1224 may generate output data. For example, the output data may include the interaction data 1020, inventory levels for individual types of items 1004, overall inventory of the facility 1002, and so forth.

Other modules 1238 may also be present in the memory 1216 as well as other data 1240 in the data store 1220. For example, the other modules 1238 may include an accounting module while the other data 1240 may include billing data. The accounting module may be configured to assess charges to accounts associated with particular users 102 or other entities based on interaction data indicative of picks and places of item 1004s, while the billing data may include information such as payment account numbers.

The associate device 114 may comprise a computing device with one or more of the elements described above with regard to the server 1104. For example, the associate device 114 may comprise a power supply, processor, clock, communication interfaces, I/O devices, memory, and so forth. The associate device 114 may comprise a smartphone, tablet, desktop computer, wearable computer, and so forth.

Illustrative Processes

Figure 13:
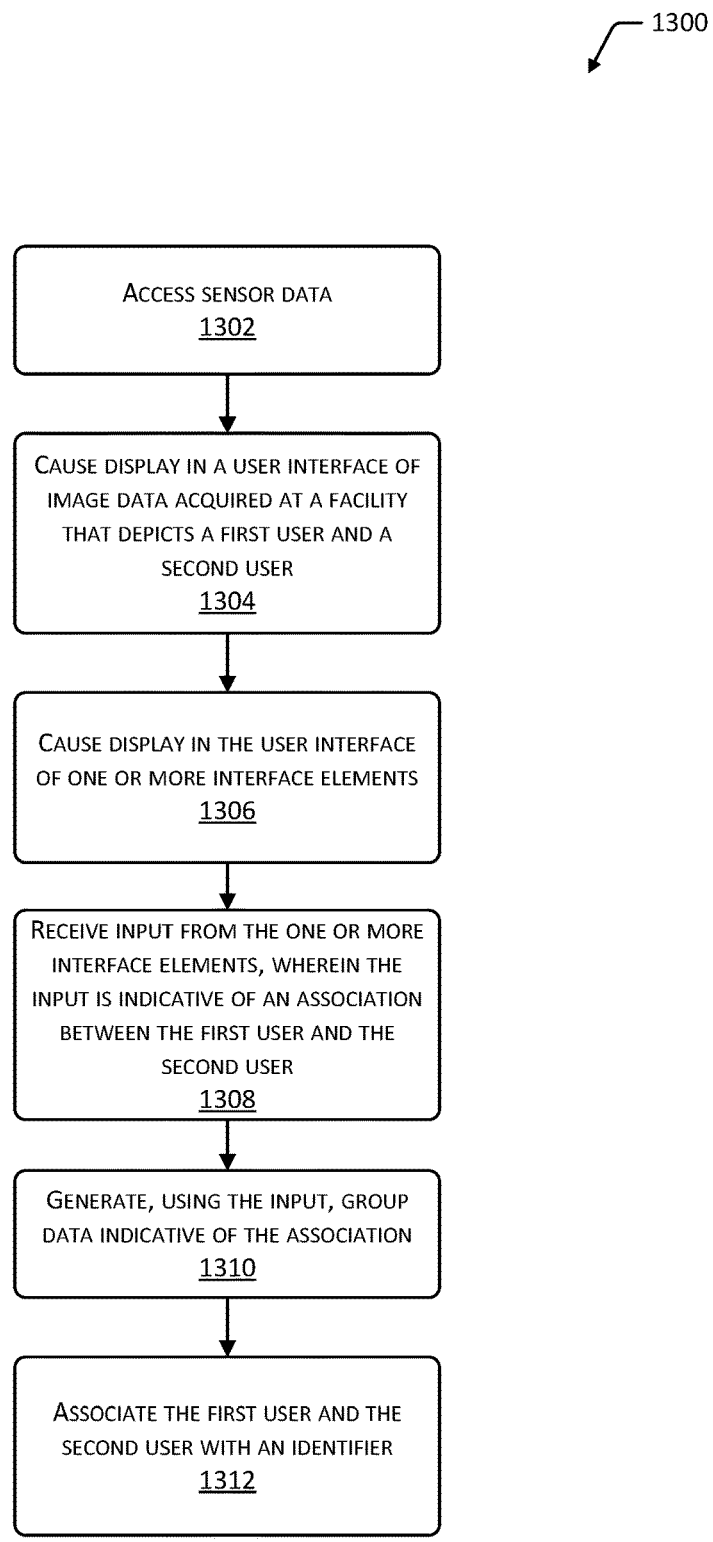
FIG. 13 depicts a flow diagram of a process for generating group data using input from an associate, according to some implementations.

FIG. 13 depicts a flow diagram 1300 of a process for generating group data 134 using input from an associate 112, according to some implementations. The process may be implemented at least in part by the user device 110, associate device 114, the server 1104, and so forth.

At 1302, sensor data 1230 is accessed. For example, within the sensor data 1230 may comprise lane data 124 indicative of input of entry credential data 122 at a particular lane 104 at first time as well as image data 128 associated with the particular lane 104 at the first time.

At 1304, the facility management system 118 causes display in a user interface 116 of first image data 128(1) obtained at a first time that depicts a first user 102(1) and a second user 102(2) at a facility 1002. For example, the system may generate HTML that when rendered by the associate device 114 displays the gallery images 320.

The system may also cause a display of the other elements described above with regard to FIGS. 3 through 9. For example, the presentation data 130 may cause display of designator indicia 312, identifier indicia 314, and so forth.

At 1306, the system causes display of one or more interface elements 322 in the user interface 116. Continuing the example above, the HTML may include interface elements such as buttons.

At 1308, input is received from the one or more interface elements 322. For example, the associate 112 may press one or more of the interface elements 322 to select or deselect particular identifier indicia 314 as belonging to the group. Information indicative of the selection may be sent as associate input data 132 to the facility management system 118. The associate input data 132 is thus indicative of an association between the first user 102(1) and the second user 102(2).

In some implementations, the display of the user interface 116 may be modified subsequent to the receipt of the associate input data 132. For example, after designating a previously untracked user 316, designator indicia 312 may appear in the user interface 116.

At 1310, group data 134 is generated using the associate input data 132 that is indicative of the association between the first user 102(1) and the second user 102(2).

At 1312, the first user 102(1) and the second user 102(2) may be associated with a single identifier. For example, given that the first user 102(1) and the second user 102(2) are members of the same group, they may be associated with a common billing account number.

Figure 14:
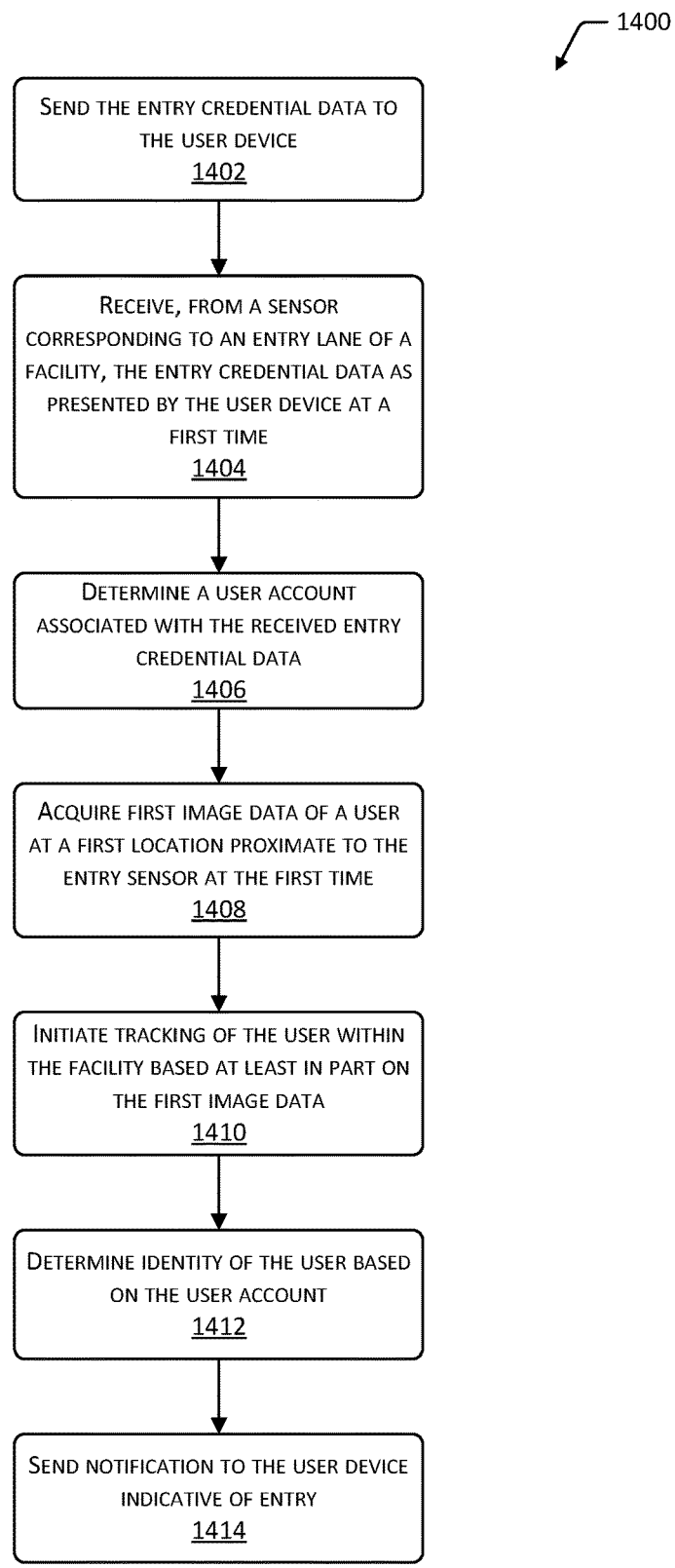
FIG. 14 depicts a flow diagram of a process for identifying a user of the facility, according to some implementations.

FIG. 14 depicts a flow diagram 1400 of a process for identifying a user 102 of the facility 1002, according to some implementations. The process may be implemented at least in part by the user device 110, associate device 114, the server 1104, and so forth.

At 1402, the entry credential data 122 is sent to the user device 110. For example, the entry credential data 122 may be sent responsive to a request for entry credential data 122. The entry credential data 122 may be valid for a particular facility 1002, for a particular period of time, and so forth. In other implementations, the user device 110 may generate entry credential data 122.

At 1404, sensor data 1230 is received from one or more sensors 108 corresponding to an entry lane 204 of the facility 1002. For example, the user device 110 may be scanned by the barcode sensor 108(1) at the gate 106 to obtain the entry credential data 122. In another example, the user device 110 may transmit a radio frequency, acoustic, or other signal that conveys the entry credential data 122 to a receiver of the entry lane 204. A computing device affiliated within the gate 106 may send lane data 124. The lane data 124 may include information indicative of the particular gate 106, output from the barcode sensor 108(1), data from other sensors 108 associated with the gate 106 such as infrared (IR) photodetectors, and so forth. For example, the lane data 124 may provide information generated by the gate 106 that is indicative of a number of users 102 who have passed through the gate 106, data indicative of a tailgating violation in which two or more users 102 enter after a single scan of entry credential data 122, and so forth.

At 1406, the user account associated with the received entry credential data 122 is determined. The entry credential data 122 may be associated with a user account. In one implementation, the entry credential data 122 comprises a temporary token storing a value that may be used to refer to a particular user account record within the facility management system 118. In other implementations, the entry credential data 122 may comprise encrypted data.

At 1408, first image data 128(1) of a user 102 at a first location proximate to the entry lane 204 at the first time is acquired. For example, the image sensors 108(2) may be used to acquire image data 128 of the gate 106 located in the lane 104.

At 1410, tracking of the user 102 within the facility 1002 is initiated, based at least in part on the first image data 128(1). For example, the image of the user 102 in the first image data 128(1) may be tracked through the entry area 202 and on into the facility 1002. As the user 102 moves within the facility 1002, they are tracked using at least the image sensors 108(2). For example, second image data 128(2) obtained from other image sensors 108(2) within the facility 1002 may be obtained. The analysis module 126 may determine a location of the user 102 within the facility 1002 using the second image data 128(2). Based on the apparent position of the user 102 within image data 128, and given the known position of those image sensors 108(2) indicated by the physical layout data 1228, tracking data 1232 indicative of the location and associated with the identifier of the user 102 may be generated.

At 1412, the identity of the user 102 is determined based on the user account. For example, the user account associated with temporary token may be determined. The identity of the user 102 may comprise information indicative of the user account.

At 1414, a notification may be sent to the user device 110 that is indicative of entry to the facility 1002. For example, the notification data may be generated and then sent to the user device 110. In some implementations, the user 102 may use the user device 110 to transmit a confirmation back to the facility management system 118. Responsive to this confirmation, the facility management system 118 may approve the user account for transactions at the facility 1002.

In some implementations, the identity of the user 102 within the facility 1002 may become uncertain. For example, the user 102 may pass through a crowd of other users 102, may add or remove a hat or other article of clothing, and so forth. The analysis module 126 may determine that the identity of the user 102 is unreliable at a second time. For example, a confidence value of the identity may be below a threshold at the second time.

As described above with regard to FIG. 3, the user interface 116 may be presented to the associate 112 to acquire associate input data 132. This associate input data 132 may then be used to determine the identity of the user 102 with a confidence greater than that previously available.

Second image data 128(2) of the user 102 at a second location at the second time may be acquired. For example, the image data 128 acquired by the image sensors 108(2) up to the time and at the location where identification was lost may be accessed.

A first set of user accounts associated with users 102 in the facility 1002 at the second time may be determined. For example, the first set of user accounts may comprise those users 102 are determined to be still within the facility 1002.

A subset of the first set of user accounts is determined. This subset comprises those users 102 which are not being tracked as of the second time. For example, the subset indicates those users 102 who are untracked.

Third image data is determined that comprises previously acquired images of those users 102 indicated by the subset. For example, the image gallery data 212 for those users 102 may be determined.

The user interface 116 may then be used to present the image gallery data 212 and the image data 128 contemporaneous with the loss of identification. For example, the user interface 116 may include display of the second image data that depicts the user 102 at the second location at the second time, the third image data that depicts the users 102 that are currently not tracked as of the second time, and one or more interface elements 322.

Associate input data 132 may be accepted using the interface elements 322 of the user interface 116. This input is indicative of an association between the second image data and the third image data. For example, association may be that the image of the user 102 identified matches a particular one of the gallery images 320.

The identity of the user 102 may then be determined based on the associate input data 132. If input indicates that the gallery image 320 of user 102 "A" matches the image of the untracked user 316, the untracked user 316 may be deemed to be user 102 "A".

Figure 15:
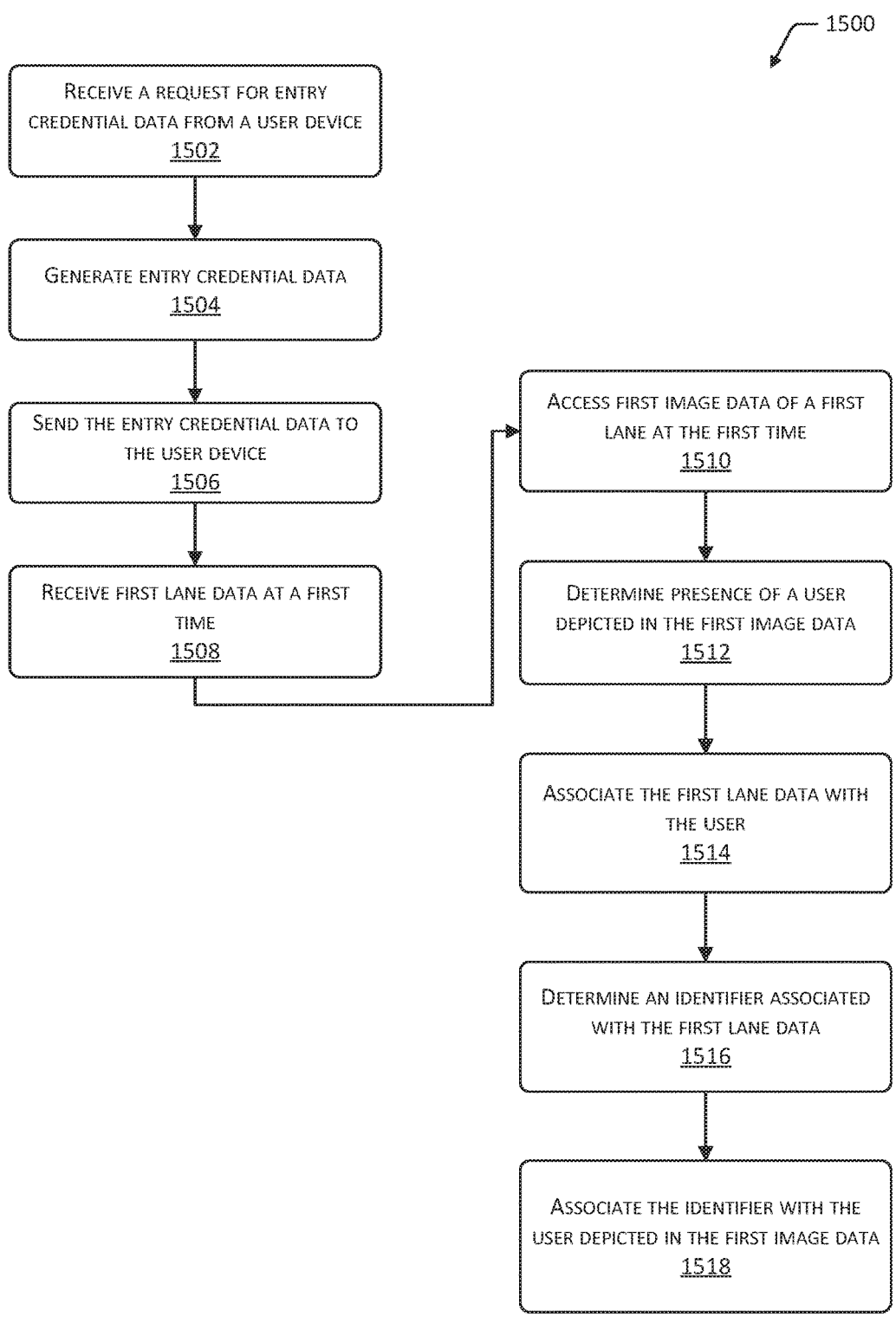
FIG. 15 depicts a flow diagram of another process for identifying a user of the facility, according to some implementations.

FIG. 15 depicts a flow diagram 1500 of another process for identifying a user 102 of the facility 1002, according to some implementations. The process may be implemented at least in part by the user device 110, associate device 114, the server 1104, and so forth.

At 1502, a request for entry credential data 122 is received from a user device 110. For example, the user device 110 may login to an authentication server and generate the request for entry credential data 122.

At 1504, the entry credential data 122 is generated or retrieved. For example, the entry credential data 122 may be generated with an expiration date and time.

At 1506, the entry credential data 122 is sent to the user device 110. The user device 110 may receive the entry credential data 122.

At 1508, first lane data 124(1) indicative of receipt of the entry credential data 122 at a first lane 104(1) of a facility 1002 at a first time is received. For example, the display of the user device 110 may present a machine readable code that is based at least in part on the entry credential data 122. For example, the machine readable code may comprise a one or two dimensional barcode.

At 1510, first image data 128(1) of the first lane 104(1) is obtained within a threshold period of the first time is accessed.

At 1512, presence of a user 102 depicted in the first image data 128(1) is determined. For example, one or more of a computer vision algorithm or manual input may be used to recognize human faces.

At 1514, the first lane data 124(1) is associated with the user 102 depicted in the first image data 128(1). For example, the association may be based on the lane data 124 indicating a particular gate 106 and timestamp of entry and determining the first image data 128(1) that was obtained with the same gate 106 at the time indicated by the timestamp.

At 1516, an identifier associated with the entry credential data 122 is determined. For example, the identifier may be encoded or encrypted within the entry credential data 122 which is provided as part of the lane data 124. In another example, the entry credential data 122 may be used to retrieve the identifier. The identifier may comprise a user identifier, account name, account number, login, and so forth.

At 1518, the identifier is associated with the user 102 depicted in the first image data 128(1). For example, the analysis module 126 may generate subsequent tracking data 1232 for the user 102 that is indicative of the identifier.

In some implementations, some of the operations described above may be performed asynchronously or at a later time. For example, the operations of blocks 1516 and 1518 may occur several seconds or minutes after the preceding operations. For example, during a peak time there may be a temporary backlog of information to be processed by the associate 112. However, once the associate input data 132 has been received and identification has been made, this identification may be retroactively applied to the observed interactions of the user 102 within the facility 1002.

Figure 16:
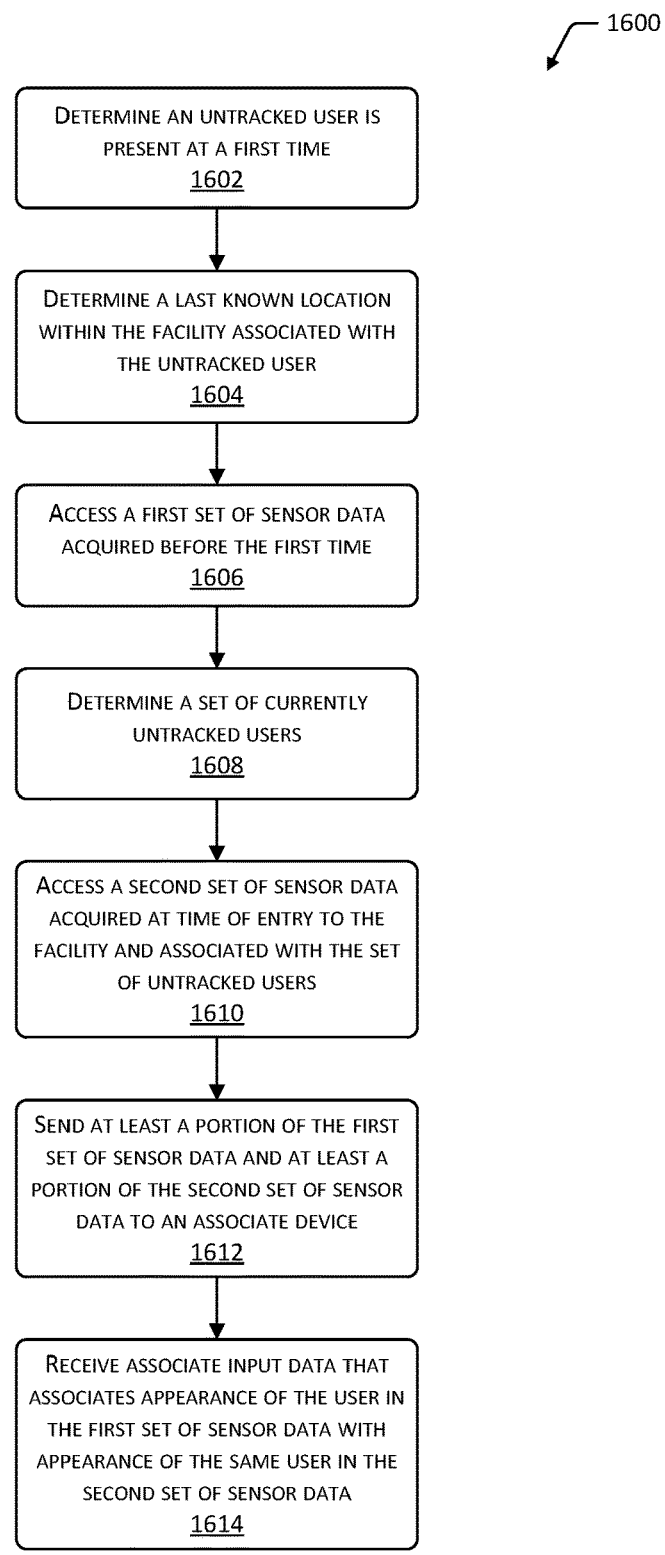
FIG. 16 depicts a flow diagram of a process for using an associate to restore tracking in an automated system after a loss, according to some implementations.

FIG. 16 depicts a flow diagram 1600 of a process for using an associate to restore tracking of a user 102 in an automated system after a loss, according to some implementations. The process may be implemented at least in part by the user device 110, associate device 114, the server 1104, and so forth.

At 1602, an untracked user 316 is determined to be present within the facility 1002 at a first time. In one implementation, the analysis module 126 may determine that the tracking of a user 102 is unreliable. For example, the tracking data may have a confidence value that has dropped below a threshold value. For example, the computer vision algorithm may be unable to differentiate different users 102 in a crowd.

At 1604, a last known location within the facility 1002 associated with the untracked user 316 is determined. For example, the tracking data 1232 may be processed to determine which identified users 102 are present up to the point of a loss in tracking.

At 1606, a first set of sensor data 1230 acquired before the first time and at the last known location is accessed.

At 1608, a set of currently untracked users 316 is determined. For example, the set of currently untracked users 316 may comprise those users 102 for which recent tracking data 1232 is unavailable.

At 1610, a second set of sensor data 1230 that is acquired at the time of entry to the facility 1002 and which is associated with the set of untracked users 316 is accessed. For example, this may comprise the image gallery data 212 for the users 102 who are currently untracked.

At 1612, at least a portion of the first set of sensor data and at least a portion of the second set of sensor data is sent to an associate device 114. For example, presentation data 130 may be generated that references at least a portion of the image gallery data 212 and the image data 128.

At 1614, the facility management system 118 receives the associate input data 132 that associates appearance of the user 102 in the first set of sensor data with appearance of the same user 102 in the second set of sensor data. For example, the associate input data 132 may designate a bounding box around the image of a previously untracked user 316. Based on a comparison with the image gallery data 212, the associate 112 may also provide information indicative of the identity of the untracked user 316.

Figure 17:
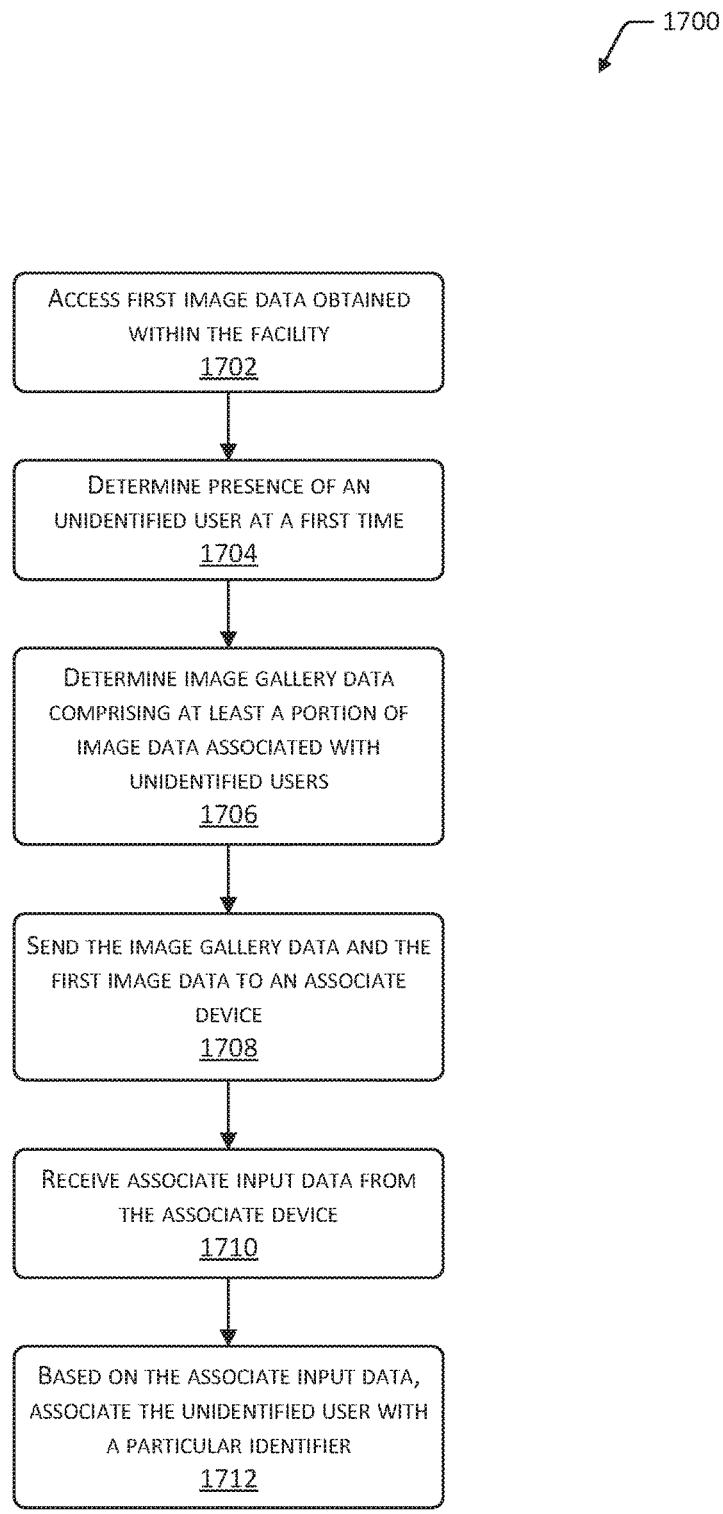
FIG. 17 depicts a flow diagram of a process for using an associate to identify a user that is unidentified by an automated system, according to some implementations.

FIG. 17 depicts a flow diagram 1700 of a process for using an associate 112 to identify a user 102 that is unidentified by an automated system, according to some implementations. The process may be implemented at least in part by the user device 110, associate device 114, the server 1104, and so forth.

At 1702, first image data 128(1) obtained within the facility 1002 is accessed.

At 1704, presence of an unidentified user 102 is determined at a first time. For example, a confidence value of an identifier associated with the user 102 depicted in the first image data 128 may drop below a threshold value.

At 1706, image gallery data 212 is determined that comprises at least a portion of previously acquired image data 128 associated with the unidentified users. For example, the images of unidentified users 102 obtained at the entry area 202 may be retrieved and presented in the image gallery data 212.

At 1708, the image gallery data 212 and at least a portion of the first image data 128(1) are sent to the associate device 114.

At 1710, associate input data 132 is received from the associate device 114. The associate input data 132 may comprise data that designates a user 102 depicted in the first image data 128(1) is the same as one of the one or more users 102 depicted in the image gallery data 212.

At 1712, the unidentified user 102 is associated with a particular identifier, based on the associate input data 132. For example, the designated user 102 indicated by the associate input data 132 may be associated with the unidentified user 102.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    one or more cameras with a field of view including at least a portion of an entry area of a facility;
    a memory, storing computer-executable instructions; and
    a hardware processor configured to execute the computer-executable instructions to:
        access image data acquired by the one or more cameras;
        determine presence of a first user in the image data;
        determine presence of a second user in the image data;
        generate a user interface that presents:
            a first section comprising:
                one or more image interface elements;
                at least a portion of the image data;
                first designator indicia associated with a depiction of the first user in the at least a portion of the image data;
                first identifier indicia associated with the first designator indicia, wherein the first identifier indicia provides a human-readable designation of the first user;
                second designator indicia associated with a depiction of the second user in the at least a portion of the image data; and
                second identifier indicia associated with the second designator indicia, wherein the second identifier indicia provides a human-readable designation of the second user; and
            a second section comprising:
                a first image of the first user; and
                a second image of the second user;
        accept input indicative of an association between the first user and the second user;
        generate group data indicative of user input; and
        based on the group data, associate the first user and the second user with a billing account number.

2. The system of claim 1, wherein the at least a portion of the image data presented in the first section comprises video of one or more of the first user or the second user in the entry area.

3. The system of claim 1, further comprising computer-executable instructions to:
    determine a wearable computing device of an associate; and
    send instructions to cause presentation of the user interface to the wearable computing device.

4. A system comprising:
    an input device;
    a display device;
    a memory, storing computer-executable instructions; and
    a hardware processor to execute the computer-executable instructions to:
        access image data acquired by one or more sensors associated with a facility;
        cause display of a user interface on the display device, the user interface comprising:
            a first image of a portion of the facility; and
            one or more interface elements;
        obtain input from the input device, wherein the input is associated with at least one of the one or more interface elements; and
        generate, using the input, group data indicative of a group comprising two or more users at the facility that share a common billing account.

5. The system of claim 4, further comprising computer-executable instructions to:
    based on the group data, associate a first user and a second user with a common session identifier.

6. The system of claim 4, wherein the one or more interface elements comprise designator indicia, each of the designator indicia associated with a depiction of a user in the first image.

7. The system of claim 6, wherein the designator indicia comprise one or more of:
    a bounding box,
    a change in background color, an outline,
an icon,
an arrow, or
a visual effect.

8. The system of claim 4, the user interface further comprising:
first identifier indicia associated with a depiction of a first user in the first image;
second identifier indicia associated with a depiction of a second user in the first image;
a first interface element outside of a boundary of the first image that is labeled with the first identifier indicia; and
a second interface element outside of the boundary of the first image that is labeled with the second identifier indicia.

9. The system of claim 4, the one or more interface elements comprising one or more of:
a refresh element associated with presentation of more recently acquired image data;
a view element associated with presentation of second image data acquired from a camera;
a forward element associated with presentation of the image data to images acquired at a later time; or
a rewind element associated with presentation of the image data to images acquired at an earlier time.

10. The system of claim 4, the user interface further comprising:
information indicative of predicted group data that is based at least in part on one or more of:
physical distance between a plurality of users to one another,
resemblance between the two or more users,
sequential entry of the two or more users at the facility, or
entry credential data obtained from the two or more users during entry of the two or more users to the facility.

11. The system of claim 4, the user interface further comprising:
identifier indicia or designator indicia indicative of an associate affiliated with the facility.

12. The system of claim 4, the user interface further comprising:
information indicative of a user account associated with a user at the facility.

13. The system of claim 4, the user interface further comprising:
an image gallery section comprising a plurality of second images of people wherein at least one of the plurality of second images is associated with a particular user identifier; and
wherein the group data is indicative of an association between the particular user identifier and a user depicted in the first image of the portion of the facility.

14. A method comprising:
causing display in a user interface of first image data obtained at a first time that depicts a first user and a second user at a facility;
causing display of one or more interface elements in the user interface;
receiving input from an input device;
associating the input with the one or more interface elements, wherein the input is indicative of an association between the first user and the second user; and
generating, using the input, group data indicative of the association between the first user and the second user and a common billing account for the first user and the second user.

15. The method of claim 14, further comprising:
causing a display of first designator indicia associated with the first user; and
causing a display of second designator indicia associated with the second user.

16. The method of claim 14, further comprising:
causing a display of first identifier indicia associated with the first user; and
causing a display of second identifier indicia associated with the second user.

17. The method of claim 14, further comprising:
accessing data indicative of identification of an associate depicted in the first image data who is affiliated with the facility; and
causing a display of one or more of identifier indicia or designator indicia indicative of the associate.

18. The method of claim 14, further comprising:
causing a display in the user interface of second image data that depicts an image of the first user as obtained at a second time; and
causing a display in the user interface of third image data that depicts an image of the second user as obtained at a third time.

19. The method of claim 14, further comprising:
determining predicted group data based at least in part on one or more of:
determined physical distance in the facility between the first user and the second user,
determined resemblance between the first user and the second user,
sequential entry of the first user and the second user at the facility, or
entry credential data obtained from the first user and the second user during entry to the facility; and
causing a display in the user interface of information indicative of the predicted group data.

20. The method of claim 14, further comprising:
determining first entry credential data associated with the first user obtained during passage through a first lane;
determining first user account information associated with the first entry credential data; and
causing a display in the user interface of at least a portion of the first user account information.

21. A method comprising:
accessing image data acquired at a facility, the image data depicting a first user and a second user;
causing display in a user interface of the image data;
causing display of one or more interface elements in the user interface;
receiving input from the one or more interface elements, the input indicative of an association between the first user and the second user; and
associating the first user and the second user with an identifier.

* * * * *